(12) United States Patent
Huq

(10) Patent No.: US 9,088,430 B2
(45) Date of Patent: *Jul. 21, 2015

(54) PROVIDING NETWORK ORIGINATED PUSH MESSAGES FOR REMOTELY TESTING A MOBILE DEVICE

(75) Inventor: Rana Huq, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1392 days.

This patent is subject to a terminal disclaimer.

(21) Appl. No.: 12/122,601

(22) Filed: May 16, 2008

(65) Prior Publication Data
US 2009/0209250 A1 Aug. 20, 2009

Related U.S. Application Data

(60) Provisional application No. 61/029,772, filed on Feb. 19, 2008, provisional application No. 61/029,779, filed on Feb. 19, 2008, provisional application No. 61/029,781, filed on Feb. 19, 2008.

(51) Int. Cl.
*H04L 12/26* (2006.01)

(52) U.S. Cl.
CPC ............ *H04L 12/2697* (2013.01); *H04L 43/50* (2013.01)

(58) Field of Classification Search
None
See application file for complete search history.

(56) References Cited

U.S. PATENT DOCUMENTS

| 7,408,660 B1 | 8/2008 | Barbeau |
| 2002/0138622 A1 | 9/2002 | Dorenbosch et al. |
| 2005/0128989 A1 | 6/2005 | Bhagwat et al. |
| 2006/0009157 A1 | 1/2006 | Chiu |
| 2006/0037072 A1* | 2/2006 | Rao et al. .......... 726/14 |
| 2006/0039538 A1* | 2/2006 | Minnis et al. ........... 379/1.01 |
| 2006/0258342 A1* | 11/2006 | Fok et al. ............ 455/414.1 |
| 2007/0117560 A1 | 5/2007 | Pora et al. |
| 2007/0287445 A1 | 12/2007 | Logan |
| 2008/0039070 A1* | 2/2008 | Ptashek .......... 455/423 |
| 2008/0198852 A1 | 8/2008 | Okamoto |
| 2009/0131043 A1 | 5/2009 | Uchida et al. |
| 2009/0207743 A1* | 8/2009 | Huq et al. .......... 370/250 |
| 2009/0207745 A1 | 8/2009 | Huq et al. |
| 2010/0273425 A1 | 10/2010 | Varanda |

FOREIGN PATENT DOCUMENTS

| CN | 1585385 A | 2/2005 |
| CN | 1878126 A | 12/2006 |

(Continued)

OTHER PUBLICATIONS

International Search Report and Written Opinion—PCT/US2009/034565, International Search Authority—European Patent Office—Jun. 19, 2009.

*Primary Examiner* — Kouroush Mohebbi
(74) *Attorney, Agent, or Firm* — Linda G. Gunderson

(57) ABSTRACT

Remote field testing of mobile communication devices is described herein. By way of example, network initiated data received at a mobile device or like device activated on a mobile network can be monitored. Further, an over the air (OTA) message sent by the mobile network to the monitored device can be identified. If pertinent to a test device or an application of the test device, the OTA message can be forwarded to the test device. In addition, an IP network, satellite network, or the other suitable remote network can be utilized to forward the OTA message. Accordingly, field testing can be implemented at a convenient place remote from the mobile network, reducing or avoiding time and cost associated with local field testing at wireless access points of the mobile network.

32 Claims, 27 Drawing Sheets

(56) References Cited

FOREIGN PATENT DOCUMENTS

| | | |
|---|---|---|
| CN | 1893391 A | 1/2007 |
| JP | 2000312188 A | 11/2000 |
| JP | 2000341225 A | 12/2000 |
| JP | 2005303627 A | 10/2005 |
| JP | 2009017195 A | 1/2009 |
| TW | I291821 B | 12/2007 |
| WO | WO03077503 | 9/2003 |
| WO | WO2005112399 | 11/2005 |

\* cited by examiner

PROVIDING NETWORK ORIGINATED PUSH MESSAGES FOR REMOTELY TESTING A MOBILE DEVICE

CROSS REFERENCE TO RELATED APPLICATIONS

The present Non-Provisional Application for Patent claims priority to Provisional Patent Application No. 61/029,772, filed on Feb. 19, 2008, and entitled PROVIDING REMOTE FIELD TESTING FOR MOBILE DEVICES, Provisional Patent Application No. 61/029,779, filed on Feb. 19, 2008, and entitled PROVIDING NETWORK ORIGINATED PUSH MESSAGES FOR REMOTELY TESTING A MOBILE DEVICE, and Provisional Patent Application No. 61/029,781, filed on Feb. 19, 2008, and entitled FACILITATING TRANSFER OF PUSH AND PULL MESSAGES FOR REMOTELY TESTING A MOBILE DEVICE, assigned to the assignee hereof and hereby expressly incorporated by reference herein.

BACKGROUND

1. Field

The following relates generally to remote communication between devices via one or more networks, and more particularly to remote field testing network-related applications or functions of a mobile device.

2. Background

In recent years, a variety of advancements has occurred in mobile communication technology and mobile communication devices. Some of the advancements, such as integration of camera and video recording technology onto such devices, incorporation of e-mail and short messaging services into mobile communication, and the like, involve software and/or hardware applications. These applications have added increased flexibility, processing power, communication capabilities and so forth, to already popular communication devices (e.g., cellular telephones). As a result, such devices have become more popular in a consumer marketplace, motivating larger numbers of consumers to purchase such devices, or to upgrade to devices that include new applications and technologies.

As larger numbers of consumers own and utilize mobile devices, business mechanisms traditionally limited to personal, radio, television or landline telephone contact are expanding into the mobile environment. For instance, as the Internet becomes increasingly accessible via mobile communication devices, e-mail and web browsing applications are utilized with mobile devices. Further, electronic commerce is also conducted by way of such devices. For instance, secure web applications can provide an interface for conducting online commercial transactions with a web browsing device. Credit card, debit card, bank transfer and like payments can be facilitated utilizing secure web applications executed at a mobile device.

Typically, new mobile device functions, applications, operating environments, and the like, are tested by manufacturers prior to commercial release. Device tests can involve conducting remote communication between devices, accessing one or more service provider networks, accessing various components of such networks, and so on. With regard to media applications and other client applications, data is typically requested from a network (e.g., web content), or pushed from the network to the device (e.g., message notifications). Application tests for push-based data exchange can vary as compared with pull-based data exchange. Accordingly, test procedures for mobile devices typically must accommodate one or both of such tests to adequately determine compatibility of new functions or applications with industry standards and design parameters of related applications or devices.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The subject disclosure provides for remote field testing mobile communication devices. In some aspects, an IP gateway of a mobile network can be monitored to facilitate data exchange between a mobile network and a test mobile device that is located outside of wireless access points of the mobile network. A mobile originated data packet, associated with a test device that is not activated on the network, can be updated or rerouted to include information of an active device. Accordingly, the mobile originated data packet initiated by the inactive test device can be accepted at the mobile network. Likewise, a network originated data packet routed to the active device, or identifying the inactive test device, can be forwarded to the inactive test device. Accordingly, the disclosed aspects can facilitate two-way data exchange between the mobile network and the inactive device. In other aspects, an over the air (OTA) message sent by a mobile network to an activated device can be forwarded to the inactive device. As such, the inactive device can receive network push messages and test functionality with respect to such push messages (e.g., short message system [SMS] messages). In still other aspects, the IP gateway can be monitored for mobile pull messages in conjunction with monitoring OTA push messages to accomplish round-trip communication for network pull or push messages to/from the inactive device. As disclosed herein, field testing can be implemented at a convenient place remote from wireless access points of the mobile network, and without pre-activating the test device on the mobile network.

Also disclosed is a method of communication between remote devices. The method can comprise monitoring source or destination data of data packets that interact with an Internet Protocol (IP) gateway of a mobile network associated with a wireless carrier. The method can also comprise identifying a data packet at the IP gateway that is directed to or originates from a mobile handset, wherein the mobile handset is not activated on the mobile network. Furthermore, the method can comprise enabling the data packet to utilize an Internet Protocol (IP) address of a device activated on the mobile network if the data packet originates from the mobile handset.

In other aspects disclosed is an apparatus that facilitates communication between remote devices. The apparatus can comprise an interface module that is activated on a network of a wireless service provider; the interface module includes indicia to identify the interface module on the network. Moreover, the apparatus can comprise a field testing module configured to identify a data packet that originates from a device that is not activated on the network and to update the data packet to include the indicia.

In one or more other aspects, disclosed is an apparatus that facilitates communication between remote devices. The apparatus can comprise means for receiving a data packet that is directed to or originates from a mobile network of a wireless carrier. Further, the apparatus can comprise means for inspecting the data packet to determine whether an originating device is a mobile handset that is not activated on the mobile network. In addition to the foregoing, the apparatus can comprise means for enabling the data packet to utilize an IP address of a device activated on the mobile network if the originating device is the mobile handset.

According to still other aspects, provided is a computer readable medium that includes computer executable instructions configured to facilitate communication between remote devices. The instructions can be executable to cause a computer to receive a data packet that is directed to or originated from a mobile network of a wireless carrier and to inspect the data packet to determine whether an originating device is a mobile handset that is not activated on the mobile network. Furthermore, the instructions can be executable to cause a computer to enable the data packet to utilize an IP address of a device activated on the mobile network if the originating device is the mobile handset.

According to one or more additional aspects, provided is a method of remote communication. The method can comprise obtaining access to an IP address of a device that is activated on a mobile network and coupling the IP address with a data packet initiated at a mobile device that is not activated on the mobile network. The method can also comprise transmitting the data packet over an IP network to a component of the mobile network.

Additionally, in some aspects disclosed is a mobile device for remote communication. The mobile device can include a transceiver configured to facilitate wireless data exchange and a field test module configured to obtain access to an IP address of a device that is activated on a mobile network. Further, the mobile device can include a packet routing module configured to couple the IP address with a data packet initiated at a mobile device that is not activated on the mobile network. In addition to the foregoing, the mobile device can include a transmission processor configured to send the data packet over an IP network to a component of the mobile network.

According to other aspects provided is an apparatus for remote communication. The apparatus can comprise means for remote communication configured to obtain access to an IP address of a device that is activated on a mobile network and means for coupling the IP address with a data packet initiated at a mobile device that is not activated on the mobile network. Moreover, the apparatus can comprise means for transmitting the data packet over an IP network to a component of the mobile network.

In one or more other aspects, disclosed is a computer readable medium comprising computer executable instructions configured to conduct remote communication between devices. The instructions can be executable to cause a computer to obtain access to an IP address of a device that is activated on a mobile network and to couple the IP address with a data packet initiated at a mobile device that is not activated on the mobile network. The instructions can be further executable to cause a computer to transmit the data packet over an IP network to a component of the mobile network.

According to still other aspects, disclosed is a method of remote communication. The method can comprise monitoring an over the air (OTA) message received at a mobile device from an OTA mobile network. Further, the method can comprise forwarding the OTA message to a test handset that is not activated on the OTA mobile network.

In some aspects, provided is an apparatus that facilitates remote communication. The apparatus can comprise a sniffing module configured to monitor a mobile network initiated message (push message) received at a mobile device from an OTA mobile network. In addition, the apparatus can comprise a router configured to forward the push message over an IP network to a test handset that is not activated on the OTA mobile network.

According to one or more further aspects, provided is an apparatus that facilitates remote communication. The apparatus can comprise means for monitoring an OTA message received at a mobile device from an OTA mobile network. The apparatus can further comprise means for forwarding the OTA message to a remote test handset that is not activated on the OTA mobile network.

In still other aspects, disclosed is a computer readable medium comprising computer executable instructions configured to facilitate remote communication. The instructions can be executable to cause a computer to monitor an OTA message received at a mobile device from an OTA mobile network. The instructions can be further executable to cause a computer to forward the OTA message to a remote test handset that is not activated on the OTA mobile network.

According to additional aspects, disclosed is a method of conducting remote communication. The method can comprise communicatively coupling to a wireless transceiver and receiving an OTA message from the wireless transceiver, the OTA message is a push message delivered by an OTA mobile network to a mobile device activated on the OTA mobile network. The method can additionally comprise using the OTA message to test a function, application, software, or firmware, or a combination thereof, of a test device that is not activated on the OTA mobile network.

In accordance with still further aspects, provided is a mobile device for conducting remote communication. The mobile device can comprise a transceiver configured to couple to a wireless network or wireless network emulator and a transmission processing module configured to receive an OTA message from the wireless network or wireless network emulator, the OTA message is a push message delivered by an OTA mobile network to a mobile device activated on the OTA mobile network. Furthermore, the mobile device can comprise a testing module configured to use the OTA message to analyze a function, application, software, or firmware, or a combination thereof, of a test device that is not activated on the OTA mobile network.

According to additional aspects, provided is an apparatus that conducts remote communication. The apparatus can comprise means for communicatively coupling to a wireless transceiver and means for receiving an OTA message from the wireless transceiver, the OTA message is a push message delivered by an OTA mobile network to a mobile device activated on the OTA mobile network. The apparatus can also comprise means for utilizing the OTA message to test a function, application, software, or firmware, or a combination thereof, of a test device that is not activated on the OTA mobile network.

In one or more additional aspects, disclosed is a computer readable medium comprising computer executable instructions configured to conduct remote communication between devices. The instructions can be executable to cause a computer to communicatively couple to a wireless transceiver and to receive an OTA message from the wireless transceiver, the OTA message is a push message delivered by an OTA mobile network to a mobile device activated on the OTA mobile network. Further, the instructions can be executable to cause a computer to utilize the OTA message to test a function, application, software, or firmware, or a combination thereof, of a test device that is not activated on the OTA mobile network.

According to other aspects, disclosed is a method of facilitating application testing for a mobile device. The method can comprise monitoring data received at a mobile device, the mobile device is activated on an OTA mobile network and identifying an OTA message received at the mobile device. The method can further comprise forwarding the OTA message to a test device, the test device is not activated on the OTA mobile network and monitoring an IP gateway associated with the OTA mobile network for data originated from the test device or associated with the test device.

In addition disclosed is an apparatus configured to facilitate application testing for a mobile device. The apparatus can comprise a data analysis module configured to monitor data received at a mobile device, wherein the mobile device is activated on an OTA mobile network and a filtering module configured to identify an OTA message received at the mobile device. The apparatus can further comprise a transmission module configured to forward the OTA message to a test device, the test device is not activated on the OTA mobile network, and a field test module configured to monitor an IP gateway associated with the OTA mobile network for data originated from the test device or associated with the test device.

According to further aspects, provided is an apparatus that facilitates application testing for a mobile device. The apparatus can comprise means for monitoring data received at a mobile device, wherein the mobile device is activated on an OTA mobile network and means for identifying an OTA message received at the mobile device. The apparatus can further comprise means for forwarding the OTA message to a test device, wherein the test device is not activated on the OTA mobile network and means for monitoring an IP gateway associated with the OTA mobile network for data originated from the test device or associated with the test device.

In one or more additional aspects, disclosed is a computer readable medium comprising computer executable instructions configured to facilitate application testing for a mobile device. The instructions can be executable to cause a computer to monitor data received at a mobile device, wherein the mobile device is activated on an OTA mobile network and to identify an OTA message received at the mobile device. Furthermore, the instructions can be executable to cause a computer to forward the OTA message to a test device, wherein the test device is not activated on the OTA mobile network and monitor an IP gateway associated with the OTA mobile network for data originated from the test device or associated with the test device.

In further aspects provided is a method of testing an un-activated mobile handset on a mobile network. The method can comprise communicatively coupling the un-activated mobile handset to a wireless transmitter of an IP network and receiving from the wireless transmitter an OTA message originated at the mobile network. The method can additionally comprise employing the OTA message to analyze a function, application, software, or firmware, or a combination thereof, of the un-activated mobile handset and initiating a response to the OTA message.

According to still other aspects, provided is a mobile device configured remote testing on a mobile network. The mobile device can comprise a wireless transceiver configured to communicatively couple the un-activated mobile handset to a wireless transmitter of an IP network and a communication processor configured to receive, via the wireless transmitter, an OTA message originated at the mobile network. The mobile device can further comprise an analysis module configured to employ the OTA message to test or adapt a function, application, software, or firmware, or a combination thereof, of the un-activated mobile handset to meet at least one specification and a data acquisition module configured to initiate a response to the OTA message.

In one or more other aspects, disclosed is an apparatus configured to test operation of an un-activated mobile handset on a mobile network. The apparatus can comprise means for communicatively coupling the un-activated mobile handset to a wireless transmitter of an IP network and means for receiving from the wireless transmitter an OTA message originated at the mobile network. The apparatus can further comprise means for employing the OTA message to analyze a function, application, software, or firmware, or a combination thereof, of the un-activated mobile handset and means for initiating a response to the OTA message.

According to at least one additional aspect, provided is a computer readable medium comprising computer executable instructions configured to test operation of an un-activated mobile handset on a mobile network. The instructions can be executable to cause a computer to communicatively couple the un-activated mobile handset to a wireless transmitter of an IP network and to receive from the wireless transmitter an OTA message originated at the mobile network. Further, the instructions can be executable to cause a computer to employ the OTA message to analyze a function, application, software, or firmware, or a combination thereof, of the un-activated mobile handset and to initiate a response to the OTA message.

To the accomplishment of the foregoing and related ends, the one or more aspects comprise the features hereinafter fully described and particularly pointed out in the claims. The following description and the annexed drawings set forth in detail certain illustrative aspects of the one or more aspects. These aspects are indicative, however, of but a few of the various ways in which the principles of various aspects can be employed and the described aspects are intended to include all such aspects and their equivalents.

DETAILED DESCRIPTION

Figure 1:
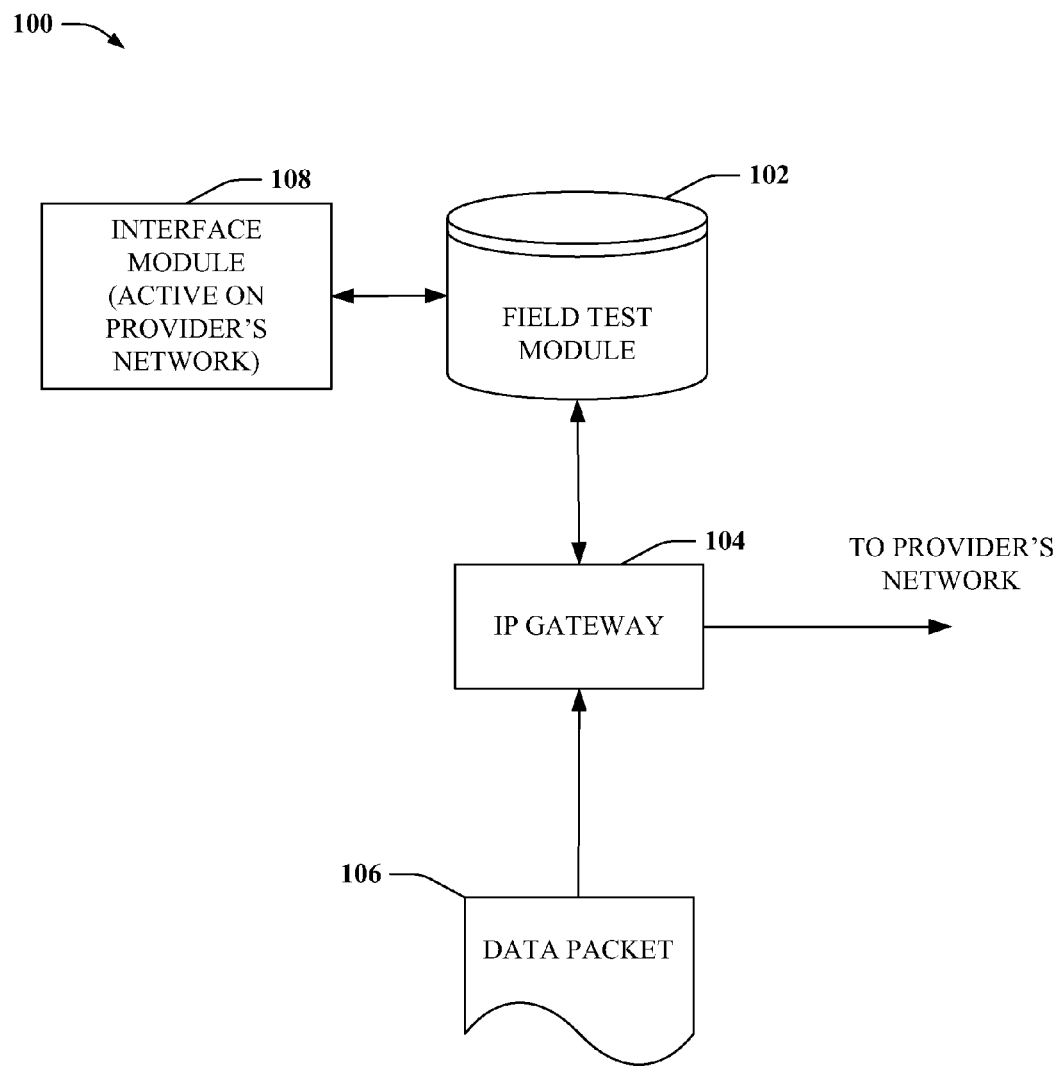
FIG. 1 depicts a block diagram of an example system that facilitates remote communication between a network and a mobile device.

Various aspects are now described with reference to the drawings, wherein like reference numerals are used to refer to like elements throughout. In the following description, for purposes of explanation, numerous specific details are set forth in order to provide a thorough understanding of one or more aspects. It can be evident, however, that such aspect(s) can be practiced without these specific details. In other instances, well-known structures and devices are shown in block diagram form in order to facilitate describing one or more aspects.

The subject disclosure provides for remote field testing of mobile devices on one or more service provider's networks. In other words, remote field testing as described herein enables the mobile device to be physically located outside of the respective network (e.g., wireless access points of the network), yet the interaction of the mobile device with the respective network can be tested. For instance, a wired and/or wireless data network (e.g., an intranet, the Internet, a satellite network) can be utilized to facilitate data exchange between the mobile device and the network. More specifically, testing can be accomplished utilizing a mobile device that is not activated on a specific service provider's network by employing an active device proxy at an IP gateway of the network. Accordingly, test-related data exchange can be provided with respect to pull messages (e.g., web browsing, network download, receiving e-mail, or short message service [SMS] data) or push messages (e.g., network notifications such as receipt of an e-mail, delivery of an e-mail, receipt of a text message, SMS message, multimedia message service [MMS] message, etc.). According to some aspects of the subject disclosure, exchange of over-the-air (OTA) messages as well as Internet Protocol (IP) data packet messages, or both, is supported.

By providing remote field testing for mobile devices, significant production time and expense can be mitigated for mobile device manufacturers, software providers, application providers, and the like. For instance, an experimental mobile device can be tested on a live mobile network without being physically located within the live mobile network. Accordingly, for example, the experimental device can be tested from a laboratory in San Diego, Calif. with respect to a mobile network in Beijing China.

Some aspects of the subject disclosure provide for significant reduction in expenses associated with testing and evaluating an experimental mobile device with respect to one or more mobile networks. Because OTA messages and data packet messages can have different network-specific data, such as routing syntax, for the same communication information from one mobile network to another mobile network(s), a device may need to be tested separately on multiple such networks. When field testing is done in a region serviced by the mobile network, significant expenses can result from such field testing. Accordingly, performing such testing at a remote site, especially a common site such as a device manufacturer's laboratory, can provide significant savings, such as experimentation, travel, and like expenses.

As one example, travel expenses associated with sending the experimental device and a technician to one or more regions serviced by one or more target mobile networks can be mitigated or avoided via remote field testing. As another example, expenses related to purchasing network components (e.g., to simulate a component of one or more of the target mobile networks, such as a wireless application protocol [WAP] browser server) and installing such components in a laboratory can be reduced or avoided. In addition to the foregoing, mobile device time-to-market can be significantly reduced by facilitating remote field testing. For instance, travel time can be mitigated or avoided. Furthermore, time required to configure and/or activate the experimental device on the target mobile network(s) can be mitigated or avoided. Accordingly, a substantial benefit is derived by providing remote field testing as described herein.

Mobile devices can include and incorporate a wide variety of applications, functions, software, and the like. Such functions can utilize routines stored on the mobile device, on a mobile network (e.g., accessed by way of a wireless access point, such as a base station), or even on a data network, such as the Internet (e.g., accessed through the mobile network or through a wired and/or wireless IP interface of the mobile device). For instance, third generation (3G) handsets support a wide variety of multimedia features and applications, which can include streaming video, streaming audio, MP3 audio and/or video, digital photographs, e-mail, SMS messaging, MMS messaging, text messaging, multimedia games, such as online games, and/or the like. Such functions and applications can upload or download content from various servers deployed throughout commercial wireless networks. In order to test applications that utilize such content, however, access to the wireless networks is often required. Accordingly, as discussed above, testing and travel delays and expenses can result from such requirements.

In some aspects, an IP gateway of a target mobile network can be monitored. For instance, a sniffing module activated on, or having a component that is activated on, the target mobile network, can be located proximate the target mobile network. Further, the sniffing module can include a database containing indicia that identifies one or more target mobile devices (e.g., a mobile device under test). Data packets intersecting the IP gateway can be inspected, and a data packet associated with a handset under test can be identified. Such a data packet can then be associated with routing information (e.g., an IP address) of a second device that is activated on the network (e.g., by way of a network address translation [NAT] device). The data packet can then be forwarded to its addressed destination (e.g., a content server on the target mobile network). The target mobile network can verify the routing information of the second device and proceed to process the data packet.

A response to the data packet described above can be routed by the target mobile network to the second device (the activated device). Traffic at the IP gateway can be monitored for such data packets, and forwarded to an interface associated with the handset under test. In some aspects, the handset under test can be coupled with a base station emulator, or an IP gateway emulator (e.g., a packet data serving node [PDSN]), or a like device to emulate OTA transmission of IP data. In such instances, the forwarded data packet can be configured to be compatible with a particular base station, gateway, or emulation device utilized to interface the handset under test with an IP network.

By identifying data packets associated with a test handset at an IP gateway of a target mobile network, and adding or modifying the data packets to include data of an activated device, the test handset can interact with the target mobile network without first having to be activated on such network. Furthermore, the interaction can utilize the worldwide IP network, enabling remote testing. Accordingly, experimental tests can be conducted while avoiding time consuming and potentially expensive procedures involved with testing the device in a region serviced by a radio network serving the target mobile network.

According to still other aspects, OTA messages can be obtained from a mobile network and forwarded to a test handset. OTA messages, transmitted by a base station, can have a format particular to a service provider's mobile network. Thus, OTA messages transmitted by a mobile network in Europe can have different routing, addressing, and like data as compared with OTA messages transmitted by a mobile network in North America. Accordingly, to test an experimental handset or experimental software on the live network, the handset often must be configured for each network. Configuration, however, takes time; a network provider often desires to test the device prior to allowing access to its network, to ensure the device is compliant with network procedures.

The subject disclosure, in at least one aspect, provides for monitoring a device that is active with respect to a target mobile network, and identifying OTA messages received at the active device via a wireless access point of the target mobile network. The OTA message can be encoded into an IP network packet, and forwarded to an interface of a remote device under test. Accordingly, the remote device can receive the OTA message and test functionality of the device (e.g., software, applications, functions, media, etc.) with respect to the live OTA message. In some aspects, OTA messages received at the active device can be filtered as a function of application-type, media-type, function-type, and so on. According to such aspects, only select OTA messages, for instance that are pertinent to a particular application under test, could be forwarded from the active device to the remote device under test. In such a manner, mobile live network push messages (e.g., e-mail notifications, server alerts, and the like) can be obtained from a mobile network and provided to a remote device for testing.

According to still other aspect, a message emulation device can be coupled with the active device. The message emulation device can record the OTA message for use with a subsequent test or test device. Accordingly, OTA messages of a particular mobile network can be obtained 'live' and recorded for subsequent experimentation. Additionally, live messages can be modified by the message emulation device to simulate non-live messages for testing purposes. Furthermore, the message emulation device can store modified messages or newly created test messages for subsequent testing as well. In at least one aspect, the message emulation device can generate OTA messages, not originated by a mobile network, and utilize such messages for testing. Messages stored, generated and/or modified by the message emulation device can be forwarded to a remote test handset via an IP network, or like network. Accordingly, modified, generated as well as live messages can be tested remotely, and can be stored for subsequent testing without subsequent access to OTA access points of the target mobile network.

According to still other aspects, mobile network push and pull messages can be utilized by a remote test handset. A desired network push message can be identified and requested from an emulation device. The emulation device can monitor live OTA messages (or, e.g., search a database of stored OTA messages) received at an active device (e.g., a mobile handset activated on the desired network) and identify the desired network push message. The desired message can be reconfigured to be compatible with IP, or a like remote communication interface such as satellite communication, and forwarded to the remote test handset.

The test handset can execute client applications related to a received OTA push message and determine validity of such applications with respect to industry standards, application parameters, and the like. In addition, the test handset can request additional application data from components of the mobile network. Such data can be utilized to analyze further aspects of a tested application. For instance, a request can be addressed to a particular server of the mobile network. An IP gateway of such mobile network can be monitored for data packets associated with the test handset (e.g., containing some indicia identifying the test handset, such as an origination address). Such data packets can be suitably associated with data corresponding to a device that is active on the mobile network. The data packet can then be forwarded to the termination device (e.g., application server).

A response by the termination device, including requested application data for instance, might typically be addressed to the active device. Data received at the IP gateway routed in such a manner, and including identifying indicia associated with the device under test, can be re-routed to an interface associated with the device under test. The response can further be updated to be compatible with a particular wireless interface utilized by the test handset. Accordingly, the test handset can be analyzed in relation to receiving a network push message and executing applications based thereon, submitting data requests for applications, receiving such data, and further executing the applications based on the received data. The analysis can be conducted for multiple various target mobile networks, and for multiple wireless interface mechanisms. Furthermore, a substantial advantage is provided by enabling such testing in any suitable remote location, and without prior-activation on a target mobile network.

Various aspects of the disclosure are described below. It should be apparent that the teaching herein can be embodied in a wide variety of forms and that any specific structure and/or function disclosed herein is merely representative. Based on the teachings herein one skilled in the art should appreciate that an aspect disclosed herein can be implemented independently of other aspects and that two or more of these aspects can be combined in various ways. For example, an apparatus can be implemented and/or a method practiced using any number of the aspects set forth herein. In addition, an apparatus can be implemented and/or a method practiced using other structure and/or functionality in addition to or other than one or more of the aspects set forth herein. As an example, many of the methods, devices, systems and apparatuses described herein are described in the context of providing dynamic mobile coupons in a mobile communication environment. One skilled in the art should appreciate that similar techniques could apply to other communication environments as well.

As used in this disclosure, the terms "component," "system," "module," and the like are intended to refer to a computer-related entity, either hardware, software, software in execution, firmware, middle ware, microcode, and/or any combination thereof. For example, a component can be, but is not limited to being, a process running on a processor, a processor, an object, an executable, a thread of execution, a program, and/or a computer. One or more components can reside within a process and/or thread of execution and a component can be localized on one computer and/or distributed between two or more computers. Further, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal). Additionally, components of systems described herein can be rearranged and/or complemented by additional components in order to facilitate achieving the various aspects, goals, advantages, etc., described with regard thereto, and are not limited to the precise configurations set forth in a given figure, as will be appreciated by one skilled in the art.

Additionally, the various illustrative logics, logical blocks, modules, and circuits described in connection with the aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. A general-purpose processor can be a microprocessor, but, in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other suitable configuration. Additionally, at least one processor can comprise one or more modules operable to perform one or more of the steps and/or actions described herein.

Furthermore, various aspects are described herein in connection with a mobile communication device (or, e.g., a mobile device). A mobile communication device can also be called a system, a subscriber unit, a subscriber station, mobile station, mobile, mobile device, cellular device, multi-mode device, remote station, remote terminal, access terminal, user terminal, user agent, a user device, or user equipment, or the like. A subscriber station can be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem or similar mechanism facilitating wireless communication with a processing device.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. In addition, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media Moreover, various aspects or features described herein can be implemented as a method, apparatus, or article of manufacture using standard programming and/or engineering techniques. Further, the steps and/or actions of a method or algorithm described in connection with the aspects disclosed herein can be embodied directly in hardware, in a software module executed by a processor, or in a combination of the two. Additionally, in some aspects, the steps and/or actions of a method or algorithm can reside as at least one or any combination or set of codes and/or instructions on a machine-readable medium and/or computer readable medium, which can be incorporated into a computer program product. Further, the term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

In addition to the foregoing, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. Furthermore, as used in this application and the appended claims, the term "or" is intended to mean an inclusive "or" rather than an exclusive "or". That is, unless specified otherwise, or clear from context, "X employs A or B" is intended to mean any of the natural inclusive permutations. That is, in this example, X could employ A, or X could employ B, or X could employ both A and B, and thus the statement "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the terms to "infer" or "inference" refer generally to the process of reasoning about or inferring states of a system, environment, and/or user from a set of observations as captured via events and/or data. Inference can be employed to identify a specific context or action, or can generate a probability distribution over states, for example. The inference can be probabilistic-that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring now to the drawings, FIG. 1 illustrates a block diagram of an example system 100 that facilitates remote field testing of devices on a mobile network. A field testing module 102 can be located proximate an IP gateway 104 of a service provider's mobile network (not depicted). The field testing module 102 can then inspect a data packet 106 interacting with the IP gateway 104. For instance, data (106) sent from the provider's network to the Internet, or to another device on an IP network can be inspected. In addition, data (106) coming from the Internet or the like can be inspected.

Field testing module 102 can be configured to update a data packet to be compatible with addressing, routing or like information associated with the provider's network. For instance, field test module 102 can utilize information associated with an active interface module 108 to enable an external device to communicate with the provider's network. Typically, a device is to be configured and activated on a service provider's network before the network accepts data from such device. Data submitted by non-active devices can often be dropped, blocked at a gateway (104) or firewall, or the like. Accordingly, to test a mobile handset on such a network, the handset typically has to be configured and activated on the network (incurring costs and delays associated therewith). However, field test module 102 can utilize information associated with an active module (e.g., a data card, a mobile device, or the like) to facilitate communication with the provider's network.

Specifically, field test module 102 can be configured to receive and/or identify a data packet 106 from a device that is not activated on the provider's network, and update the data packet to include unique indicia that identifies an activated device. The unique indicia can be bundled with the data packet 106, which can then be forwarded to the service provider's network. Because the unique indicia is associated with an active device, the service provider's network can receive, respond to, etc., the data packet 106. Accordingly, the data packet need not be sent by a device that is activated on the provider's network, saving time and expense associated with activation. In addition, the data packet 106 need not be sent by a device via a wireless access point associated with the provider's network. For instance, the data packet 106 can be sent from any suitable IP access point having a wired and/or wireless link with the IP gateway 104. As a specific example, which should not be construed as limiting, the data packet can be sent from a laboratory having a wired Internet connection (e.g., cable, digital subscriber line [DSL], Ethernet, and so on), a wireless Internet connection (e.g., worldwide interoperability for microwave access [WiMAX], wireless wide area network, satellite Internet interface) or a wired and wireless Internet connection (e.g., a wireless local area network [WLAN], Bluetooth™, near field communication [NFC], or like wireless interface to a wired Internet connection). In some aspects of the subject disclosure, the data packet can be sent via a wireless link to the Internet. The wireless cellular link can comprise a global system for mobile communication (GSM)/general packet radio service (GPRS) link, a universal mobile telecommunication system (UMTS) link, a code division multiple access (CDMA) or wideband CDMA (W-CDMA) link, or a like cellular link, or a combination of the foregoing.

Figure 2:
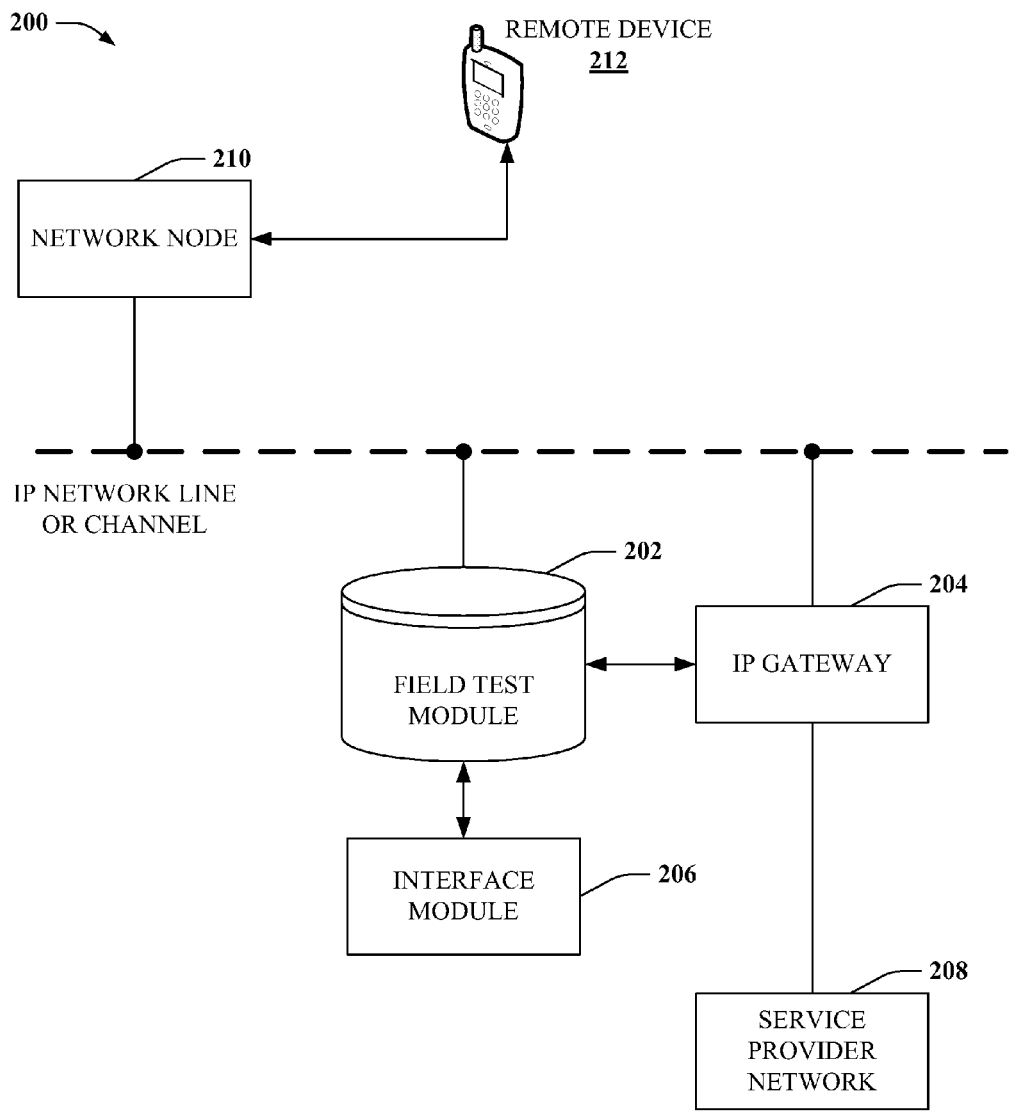
FIG. 2 illustrates a block diagram of a sample system that provides remote testing for a mobile device on a service provider's mobile network.

FIG. 2 depicts a block diagram of an example system 200 that provides remote testing for a mobile device on a service provider's mobile network 208. System 200 can provide round-trip communication between a mobile device (not depicted) and the service provider's mobile network 208. Specifically, data sent by the mobile device can be updated to be compatible with the provider's network 208, and information sent by the provider's network can be re-routed to the mobile device. Accordingly, system 200 can facilitate testing such a mobile device on the target mobile network 208 without having to utilize a radio access network associated with the service provider's mobile network 208, or configure and physically locate the mobile device for direct communication with the target mobile network 208.

System 200 can include a field testing module 202 that can be configured to include identifying indicia of one or more remote devices 212. The identifying indicia can include an IP address, a media access control (MAC) address, or other suitable information that can distinguish a remote device 212 from other remote devices at the field testing module 202. In addition, system 200 can include an interface module 206 that is configured for/activated on the wireless service provider's network 208. The interface module 206 can include unique indicia suitable to identify the interface module on a network (e.g., an IP address, a MAC address, a subscriber identity module [SIM], and so on).

The remote device 212 can include media applications or the like that consume data stored at the service provider's network. In order to test such media applications properly, the remote device 212 can require particular information stored at the provider's network. Accordingly, the remote device 212 can send a request to the service provider's network 208 via a network node 210 for such information. The request can be a data packet that includes the identifying indicia (e.g., an originating IP address), addressed to the service provider's network 208 (e.g., having a terminating IP address of a component of the network 208).

By monitoring an IP gateway 204 of the service provider's network 208, field testing module 202 can inspect data packets addressed to the network. In addition, the field testing module 202 can inspect the data packets to identify whether indicia identifying a remote device 212 are included within the data packet. For example, the field testing module 202 can cross-reference memory configurations to identify predetermined remote devices (212).

If a data packet of a suitable remote device 212 is identified by the field testing module 202, the data packet is updated to include information associated with an interface module 206 that is activated on the service provider's network. Specifically, the field testing module 202 can update the data packet in a manner that is compatible with the service provider's network. For instance, the data packet can be modified or updated so that an originating IP address associated with the data packet corresponds with the interface module 206 instead of the remote device 212. Accordingly, the data packet can appear to have originated from an active device, rather than an inactive remote device 212.

In addition to the foregoing, field testing module 202 can monitor the IP gateway 204 to identify data packets addressed to the interface module from the provider's network 208 (e.g., a response data packet). Data packets addressed in such a manner can be further inspected to determine identifying indicia associated with one or more remote devices 212. If such identifying indicia are determined, the data packet(s) can be re-routed to the network node 210 providing IP access to the remote device 212. As one particular example, the field testing module can update or modify a terminating IP address of the identified data packet(s) to reflect an IP address of the network node 210 and/or remote device 212.

Accordingly, by utilizing information pertaining to the interface module 206 or other suitable device activated on the service provider's network 208, field testing module 202 can translate and/or re-route data packets to facilitate communication between the service provider's network and the remote device 212. The communication can be accomplished even if the remote device 212 is not within wireless access range of the provider's network (e.g., within a region serviced by an OTA radio base station associated with the network 208). Furthermore, the communication can be accomplished even if the remote device 212 is not configured for/activated on the provider's network 208. Accordingly, substantial reduction of time and expenses associated with testing experimental devices (212) on one or more target networks (208) is provided by the subject disclosure.

Figure 3:
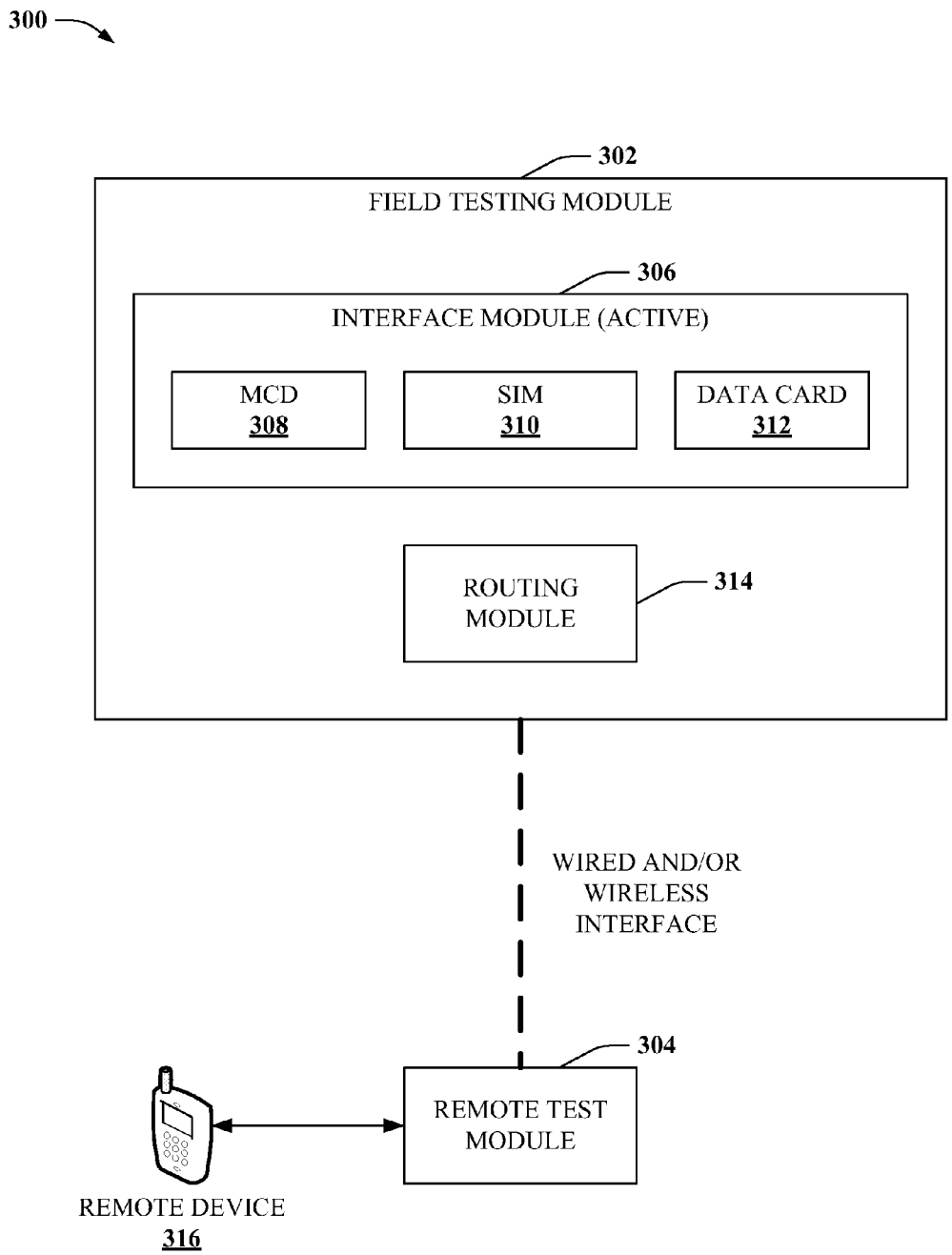
FIG. 3 depicts a block diagram of a sample system that provides remote testing at a mobile network for an inactive device.

FIG. 3 depicts a block diagram of a sample system 300 that provides proxy communication for a mobile device. The proxy communication can enable the mobile device 316 to engage in data exchange with one or more target mobile networks. Further, the mobile device 316 need not be activated on the target mobile network(s) for such data exchange to be accomplished. Accordingly, remote testing can be facilitated via any suitable common interface to the mobile device and the mobile network(s), such as the Internet or other data network.

Field testing module 302 can include an interface module activated on a target mobile network (not depicted). The interface module 306 can comprise a mobile communication device 308 that has been activated on the mobile network. For instance, the mobile communication device can be configured in accordance with addressing, routing and like data packet syntax particular to the mobile network. In addition, the mobile communication device can comport with other regulations and requirements pertinent to the mobile network. Alternatively, or in addition, the interface module can comprise a subscriber identity module (SIM) card 310. The SIM card 310 can be associated with a device activated on the mobile network, such as the mobile communication device 308. The SIM card 310 can comprise identifying indicia (e.g., IP address, or other information suitable to identify the SIM card 310) suitable to identify the SIM card 310 at the mobile network. Accordingly, a data packet including the identifying indicia can be interpreted by the mobile network as originating from or terminating at a mobile device associated with the SIM card 310. In at least one other aspect, interface module 306 can comprise a data card 312. The data card 312 can be can by an electronic device suitable to store and/or be associated with routing and addressing information pertinent to the target mobile network. In a like manner as with the SIM card 310, data card 312 can comprise identifying indicia that can distinguish the data card at the mobile network. Accordingly, data received at the mobile network, comprising information associated with the mobile communication device 308, SIM card 310, and/or data card 312, can be accepted, processed and/or consumed by the mobile network.

In addition to the foregoing, interface module 306 can comprise a routing module 314. Routing module 314 can be deployed proximate a component of a target mobile network, for instance, at an IP gateway of such mobile network. In addition, the routing module 314 can be configured to forward a data packet, updated with information associated with an active device (308, 310, 312), to a recipient mobile network. For instance, the routing module 314 can update the data packet to reflect a terminating address associated with a target server, or other component of the mobile network, in a syntax recognized by the mobile network.

Alternatively, or in addition to the foregoing, routing module 314 can receive a data packet originating from the mobile network (e.g., where such data packet is addressed to the mobile communication device 308, SIM card 310 and/or data card 312). If the data packet contains information identifying a remote device 316 (e.g., obtained via the field testing module 302, see e.g., FIG. 2, supra), the routing module 314 can forward the received data packet to the remote device 316, and/or a remote test module 304 that provides the remote device 316 with a wired and/or wireless interface to the field testing module 302 (e.g., via a data network such as the Internet). As a particular example, the routing module can update or modify the data packet identifying the remote device 316 to include a terminating address associated with such device 316 and/or with the remote test module 304. Accordingly, traffic initiated by the remote device 316 can be associated with an active interface module 306 and forwarded to a target mobile network. Likewise, traffic initiated by the remote target mobile network and addressed to the active interface module 306, having some indicia identifying the remote device 316, can be re-routed to the remote device 316.

Remote test module 304 can be configured to provide remote device 316 with access to field testing module 302. For instance, the remote test module 304 can couple the remote device 316 with an IP network connected to the field testing module 302. A data packet originated by a target mobile network (e.g., in response to a request for data originated by remote device 316) can be routed to remote test module 304. Such data packet can then be transmitted to the remote device via a suitable wired or wireless transmission mechanism.

In one aspect, remote test module 304 can provide wired access between the remote device 316 and the IP network. In another aspect, remote test module 304 can provide wireless access between the IP network and the remote device 316. Accordingly, various suitable network interface mechanisms can also be tested in connection with accessing data from a target mobile network. Furthermore, field testing module 304 and/or routing module 314 can configure data originated at the network to be compatible with a particular interface mechanism, as suitable (e.g., a wireless transmission technology, wired transmission technology, or the like). Alternatively, or in addition, remote test module 304 can convert IP network packets to wired and/or wireless OTA messages, as suitable, for transmission to the remote device. Thus, device (316) testing can be conducted utilizing each succeeding network interface between the device (316) and the target mobile network. Specifically, a test device (316) can communicate with remote test module 304 (e.g., comprising a base station emulator, an access point emulator, etc.), a wireless access point, and/or any suitable radio network via conductive, radiated and/or Bluetooth communication (e.g., a WiMAX, CDMA, WCDMA, UMTS, GPS/GPRS radio network).

Further to the above, the wireless access can comprise radio transmission over a licensed cellular frequency. For instance, the remote test module 304 can comprise a base station emulator that facilitates wireless communication with a mobile device utilizing one or more licensed cellular frequencies, one or more cellular communications standards, one or more cellular communication protocols, or a combination thereof or of the like (e.g., GSM/GPRS, UMTS, CDMA, W-CDMA). In another example, the remote test module 304 can comprise a near field communication (NFC) transmitter. In still other examples, the remote test module 304 can comprise a Bluetooth or like device, that provides relatively short range (e.g., up to approximately 30 meters) communication. According to one or more additional aspects, the remote test module can provide wired and wireless access to an IP network for the remote device (e.g., utilizing a suitable combination of the foregoing or of the like). By providing various wired or wireless transmission mechanisms, functionality of remote device 316 can be tested with respect to such mechanisms. So, for instance, device applications and functionality that consume mobile network data can be tested by way of a UMTS, WCDMA, or GSM, etc. emulated (or live) interface, or via a like wireless transmission architecture or combinations thereof.

Figure 4:
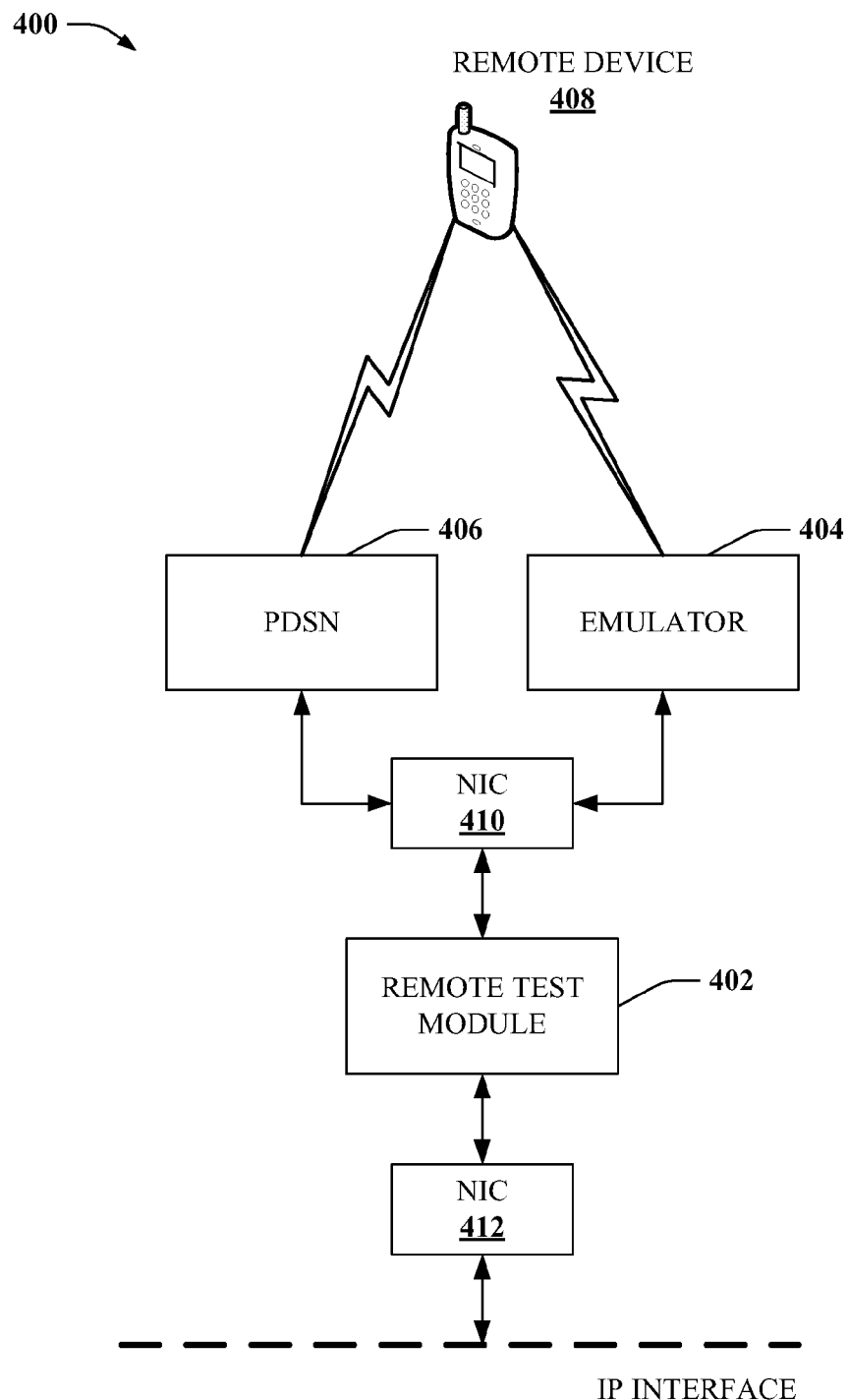
FIG. 4 illustrates a block diagram of an example system that provides a wireless interface for a mobile device to a remote test module and an IP network.

FIG. 4 illustrates a block diagram of an example system 400 that provides a wireless interface to a remote test module 402 and/or an IP network for a mobile device 408. In some aspects, system 400 can provide the mobile device 408 with an interface to the Internet. Accordingly, remote device 408 can access any suitable device or network that is coupled with the IP network.

Remote test module 402 can comprise one or more wireless access interfaces. In one aspect, remote test module 402 can include a first network interface card 410 coupled to a wireless transceiver device (404, 406). In another aspect, the wireless transceiver device (404, 406) can comprise a base station emulator 404. The base station emulator 404 can provide a wireless interface between the remote test module 402 and the remote device 408 (e.g., a cellular phone, third generation [3G] phone, multi-mode phone, etc.). As a particular example, the base station emulator 404 can provide wireless communication with a mobile device utilizing one or more licensed cellular frequencies, one or more cellular communications standards, one or more cellular communication protocols, or a combination thereof or of the like (e.g., GSM/GPRS, UMTS, CDMA, W-CDMA). In another example, the base station emulator 404 can comprise a near field communication (NFC) transmitter. According to yet another example, the base station emulator 404 can comprise a Bluetooth or like device, that provides relatively short range (e.g., up to approximately 30, meters) wireless communication. By providing various wireless transmission mechanisms, functionality of remote devices (316) configured for different wireless transmission architectures (e.g., GSM/GPRS, UMTS, CDMA, W-CDMA, etc.) can be tested.

In addition, NIC 410 can couple the remote test module 402 with a packet data serving node (PDSN) 406 or PDSN emulator. The PDSN can simulate network gateway functionality, such as conversion of mobile network communication to IP network communication, and vice versa. Remote test module 402 can then couple the remote device 408 and wireless transceiver device (404, 406) to an IP network by way of a second NIC 412. Accordingly, data transmitted by the remote device 408 can be routed to any suitable device or network coupled with the IP network (e.g., a target mobile network). Accordingly, system 400 can facilitate connection to a worldwide network such as the Internet while simulating various wireless and/or cellular communication technologies and architectures for the remote device 408.

Figure 5:
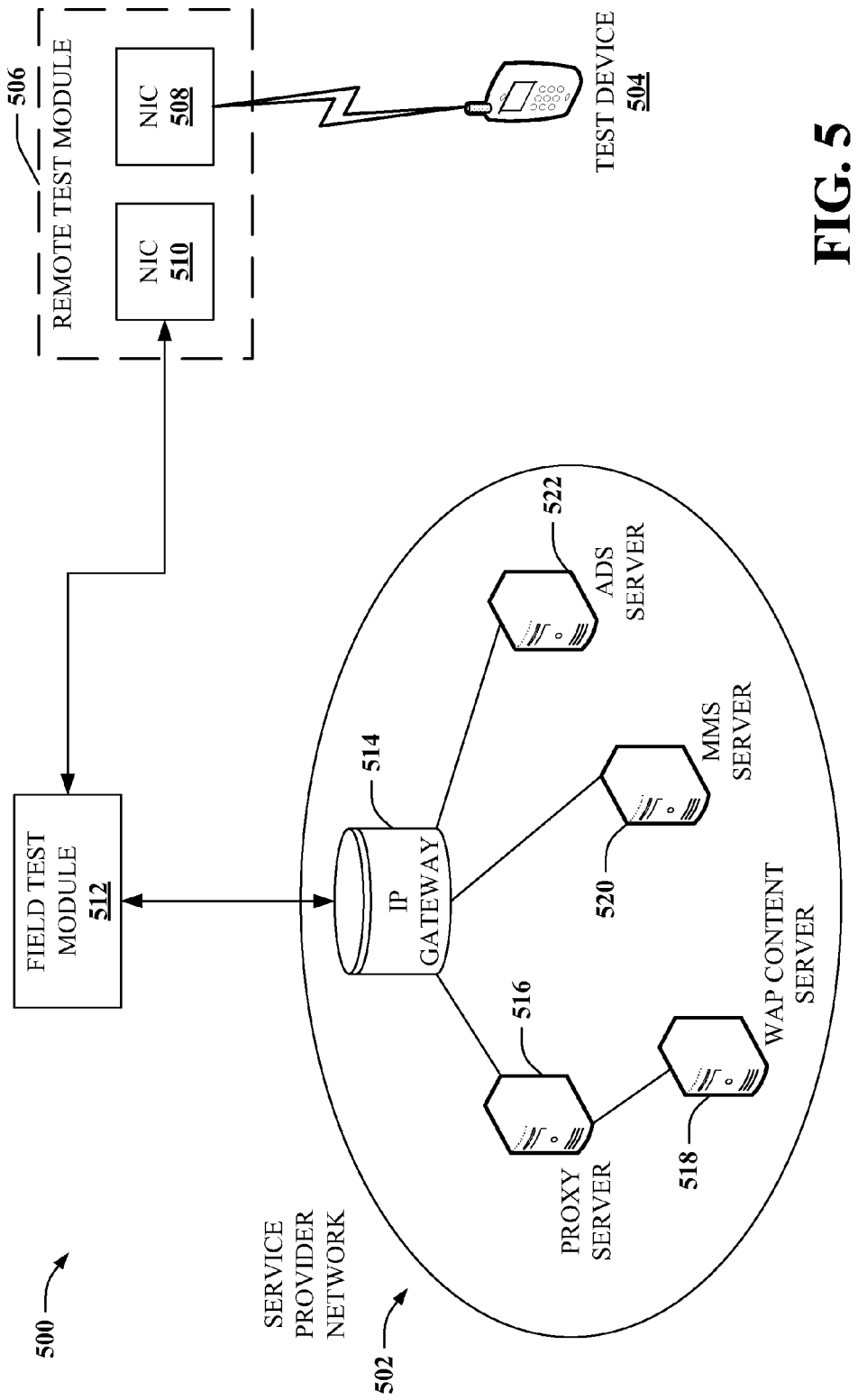
FIG. 5 depicts a block diagram of an example system that facilitates data exchange between a mobile network and an inactive device according to aspects.

FIG. 5 depicts a block diagram of an example system 500 that facilitates data exchange between a mobile network 502 and a remote test device 504 according to aspects of the subject disclosure. System 500 can include a remote test module 506 that can communicatively couple to the remote test device 504 by way of a NIC 508. The remote test module 506 can also couple to a field test module 512 by way of a second NIC 510. The second NIC 510 and the field test module 512 can utilize, for instance, a data network connection such as an IP connection.

Remote test module 506 can facilitate translating IP data received at NIC 510 from field test module 512 to wireless OTA messages. The wireless OTA messages can be cellular-related messages (e.g., GSM/GPRS, UMTS, CDMA, W-CDMA messages), WLAN-related messages, Bluetooth-related messages, NFC-related messages, or the like, having a format suitable for a particular wireless communication architecture utilized between remote test module 506 and test device 504. Accordingly, system 500 can analyze the test device 504 and tested client functionality utilizing various suitable wireless interface standards.

Data sent from the test device 504 to the service provider's network 502 is submitted to the remote test module 506, which forwards the data to an IP gateway 514 associated with the service provider's network 502 via the field test module 512. Field test module 512 can receive the data and modify, update, re-configure, etc., such data to be compatible with the service provider's network 502. For instance, the data can be modified to indicate an originating device that is activated on the service provider's network 502. Accordingly, test device 504 need not be activated on a target mobile network (502) in order to receive and consume data stored at such network (502).

Data originated at the test device 504 and received at the IP gateway 514 can be forwarded to a terminating device (516, 518, 520, 522) on the network 502 if the data complies with network requirements (e.g., implemented by field test module 512). Components (516, 518, 520, 522) of the network 502 can include a proxy server 516 that services one or more wireless application part (WAP) content servers 518, a multimedia message system (MMS) server 520, an active directory service (ADS) application server 522, or the like. Such servers can provide data utilized by client applications (e.g., mobile device applications and/or software) associated with the servers, including e-mail, messaging, streaming media, or a combination thereof or of the like.

Data sent by the provider's network in response to a message routed from the test device 504 can be received at the field test module 512. As a particular example, such data can be addressed and routed to a device (512) that is activated on the network, where information associated with such active device (512) was utilized to configure test device 504 data addressed to the provider's network 502. The network originated data received at the field test module 512 can be re-routed to the remote test module 506 (or, e.g., directly to the test device 504) for delivery to the test device 504. Re-routing can be based on the fact that the network-originated data was addressed to the active device (512) (routing information of which is unique to the field test module 512). In other aspects, re-routing can be based on information identifying the remote test module 506, or the test device 504, contained within the network-originated data (e.g., an IP address or MAC address, or the like).

Test device 504 can receive the network-originated data via the wireless connection to NIC 508. The data can then be utilized to execute and test one or more applications, functions, software, operating systems, or the like, located at the test device 504. For instance, the data can be an e-mail message sent to an e-mail address. As a specific example, the two-way data exchange can enable the test device 504 to log into a WAP server (e.g., 518) to access a web-based e-mail message, or log into an e-mail server (not depicted) located on the mobile network provider's network 502.

As described, system 500 provides two-way communication between a mobile handset (504) and a target mobile network (502). The communication can be utilized to test functionality of the mobile handset (504) even if the handset is not active on the target mobile network (502). Further, the communication can be accomplished from any suitable remote location that can communicate with an IP gateway (514) of the target mobile network (502). Thus, system 500 can provide significant cost reduction and/or time reduction in conjunction with testing experimental mobile devices, mobile device applications, software, operating systems, and/or the like.

Figure 6:
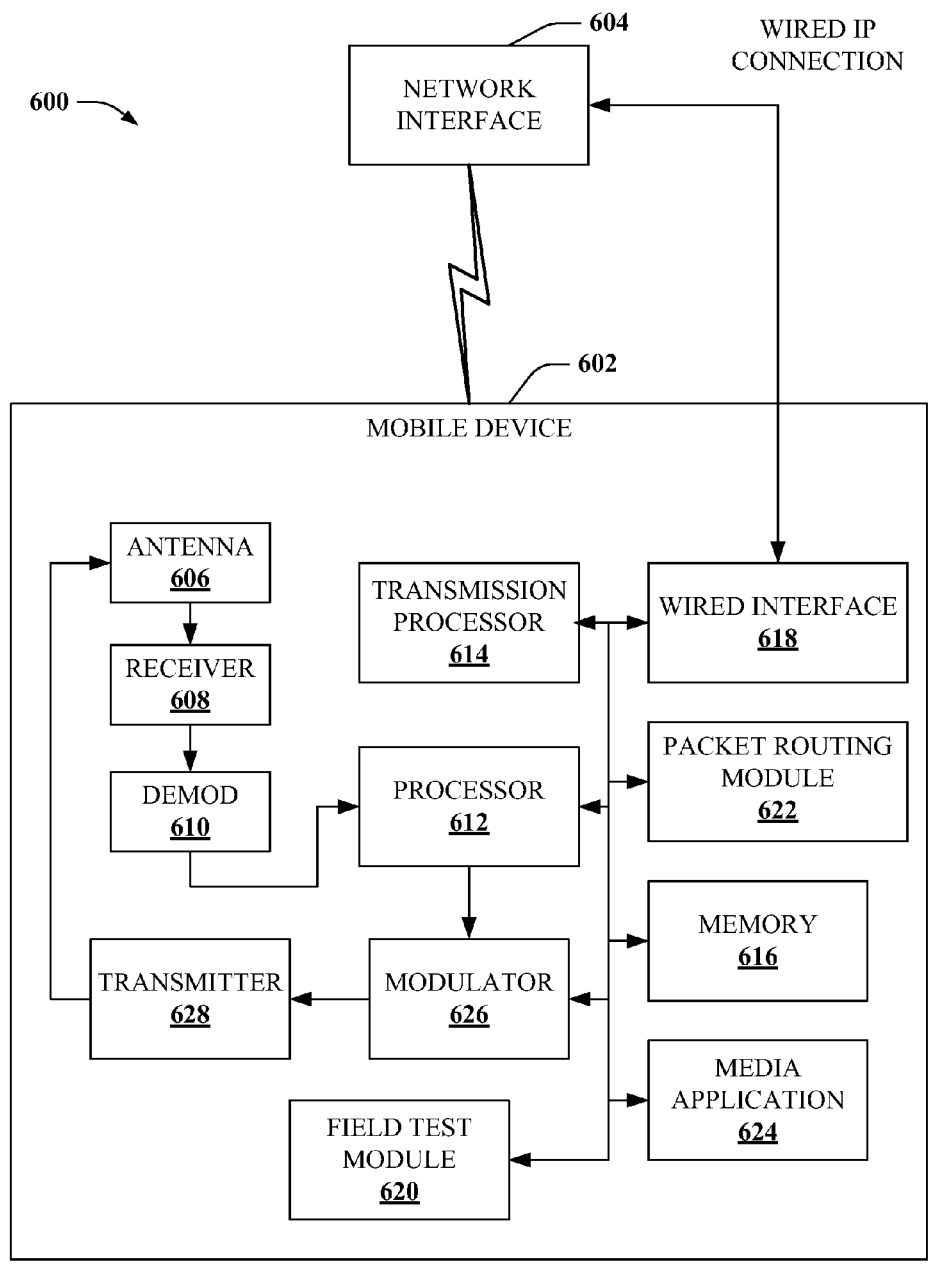
FIG. 6 illustrates a block diagram of a sample mobile device that can conduct remote data exchange to facilitate testing the mobile device on a remote network.

FIG. 6 illustrates a block diagram of a sample system 600 including a mobile device 602. As depicted, mobile device 602 can conduct data exchange with a remote network via a network interface 604 to facilitate testing an application of the mobile device 602. The network interface 604 can translate data originating from the mobile device 602 and terminating at the remote network so the data is compatible with requirements of the remote network. Accordingly, mobile device 602 can request data from the remote network without being activated on the network, and without utilizing OTA access points of such network.

Mobile handset 602 includes at least one antenna 606 (e.g., a transmission receiver or group of such receivers comprising an input interface) that receives a signal (e.g., comprising data pertinent to a client application of mobile device 602) and a receiver 608, which performs typical actions (e.g., filters, amplifies, down-converts, etc.) on the received signal. Specifically, antenna 606 and transmitter 628 (collectively referred to as a transceiver) can be configured to facilitate wireless data exchange with remote devices. Antenna 606, in conjunction with receiver 608 and/or transmitter 628 can send and receive data utilizing a unicast pull message submitted to a remote mobile network (not depicted). In addition, antenna 606, receiver 608 and/or transmitter 628 can receive a unicast push message or broadcast push message transmitted by the remote mobile network. In one example, antenna 606 can be configured to receive a response to data transmitted to a mobile network via transmitter 628 (e.g., from a component of the mobile network), wherein the response is addressed by the mobile network to a device activated on the mobile network and re-routed by the network interface 604 to the antenna 606.

Antenna 606 and receiver 608 can also be coupled with a demodulator 610 that can demodulate received symbols and provide them to a processor 612 for evaluation. Processor 612 can analyze information received by antenna 606 and/or generate information for transmission by a transmitter 628. Additionally, processor 612 can control and/or reference one or more components (606, 608, 610, 614, 616, 618, 620, 622, 624, 626, 628) of the mobile handset 602. Further, processor 612 can execute one or more modules, applications, engines, or the like (620, 622, 624) that comprise information or controls pertinent to executing functions of the mobile device 602. For instance, such functions can include sending and/or receiving OTA data or IP data, executing applications or hardware, software and/or firmware modules of the mobile device 602, formulating requests for data pertinent to such applications and functions, storing and retrieving routing information for network components, and transmitting such requests for data to pertinent network components, or the like. Alternatively, or in addition, the modules (620, 622, 624) can comprise information or controls pertaining to executing one or more client applications based on data received from a remote network, and comparing execution or results of the execution to a standard or a parameter of the client application(s).

In some aspects, mobile handset 602 can include a transmission processor 614 that can be configured to send a data packet or wireless message via the modulator 628 and transmitter 628 (e.g., wireless transmission). In other aspects, the transmission processor 614 can be configured to employ a wired interface 618 for transmitting data, wherein the data packet is sent by the transmission processor 614 to the network interface 604 at least in part via the wired interface 618. Such a data packet or wireless message can be configured to request information from a component of a mobile network. In some aspects, the information requested can be pertinent to testing one or more client applications, functions, or software of the mobile device 602.

According to further aspects, transmission processor 614 can be configured to communicatively couple to a base station emulation network (604) to, at least in part, access an IP network (e.g., an intranet, the Internet). Data sent by mobile device 602 over the IP network can be routed to an IP gateway of the mobile network, for instance. Further, the base station emulation network (604) can simulate various wireless access technologies, enabling the mobile device 602 to test applications utilizing such various access technologies. In at least one aspect, transmission processor 614 can be configured to couple to a PDSN emulation network (604) to, at least in part, access the IP network. The PDSN emulation network can simulate translation protocols involved in transmitting mobile-based network data (e.g., employing cellular or like radio transmission communication) to an IP-based network and vice versa.

Mobile handset 602 can additionally include memory 616 that is operatively coupled to processor 612. Memory 616 can store data to be transmitted, received, and the like. Further, memory 616 can store data pertaining to network routing information of various mobile network components (e.g., application servers). Such data can be utilized to request information from such network components.

Mobile device 602 can include program modules (620, 622, 624) pertinent to testing mobile device applications and sending or receiving data related to such applications. For instance, a field test module 620 can be configured to obtain access to an IP address of a device that is activated on a mobile network. As an example of the foregoing, the field test module 620 can be configured to submit a request to a device that is activated on the mobile network (604), or a routing module affiliated with such device (604), to obtain the access to the IP address. The IP address can then be utilized to translate a request sent by mobile device 602 into a request that is compatible with a particular mobile network. Accordingly, the mobile device 602 need not be pre-configured with the particular mobile network to communicate with such network.

In some aspects, field test module 620 can request and receive the IP address (and, e.g., data syntax and formats utilized by the mobile network) from the network interface 604. In such aspects, a packet routing module 620 can be configured to couple the IP address obtained by the mobile device 602 with a data packet initiated at the mobile device 602. Particularly, coupling the IP address with the data packet can accord with any syntax or formats required by the particular mobile network. Accordingly, data transmitted by the mobile device 602 can comply with the mobile network's requirements according to such aspects.

Mobile device 602 can further include a media application 624. Media application 624 can be configured to generate a data packet that requests information from the mobile network. The media application 624 can further be configured to consume information provided by a component of the mobile network in response to the data packet. The media application 624 can comprise a messaging application, a game, a streaming media application, a web-browsing application, or a like application that pulls data from a network in conjunction with executing the application. In still other aspects, the media application 624 can comprise an application that receives and consumes information pushed by the network to the mobile device 602 in a network push message (e.g., a unicast push message, a broadcast push message).

Mobile handset 602 can still further comprise a modulator 626, and a transmitter 628 that transmits generated signals (e.g., by processor 612 and modulator 626) to, for instance, network interface 604, a base station, an access point, another access terminal, a remote agent, etc. Although depicted as being separate from processor 612, it is to be appreciated that transmission processor 614 can be part of processor 612 or a number of processors (not depicted). As described, system 600 provides a mobile device 602 that can facilitate testing client applications, device functions and/or or device software remote from a network data store, and without being pre-activated on the network.

Figure 7:
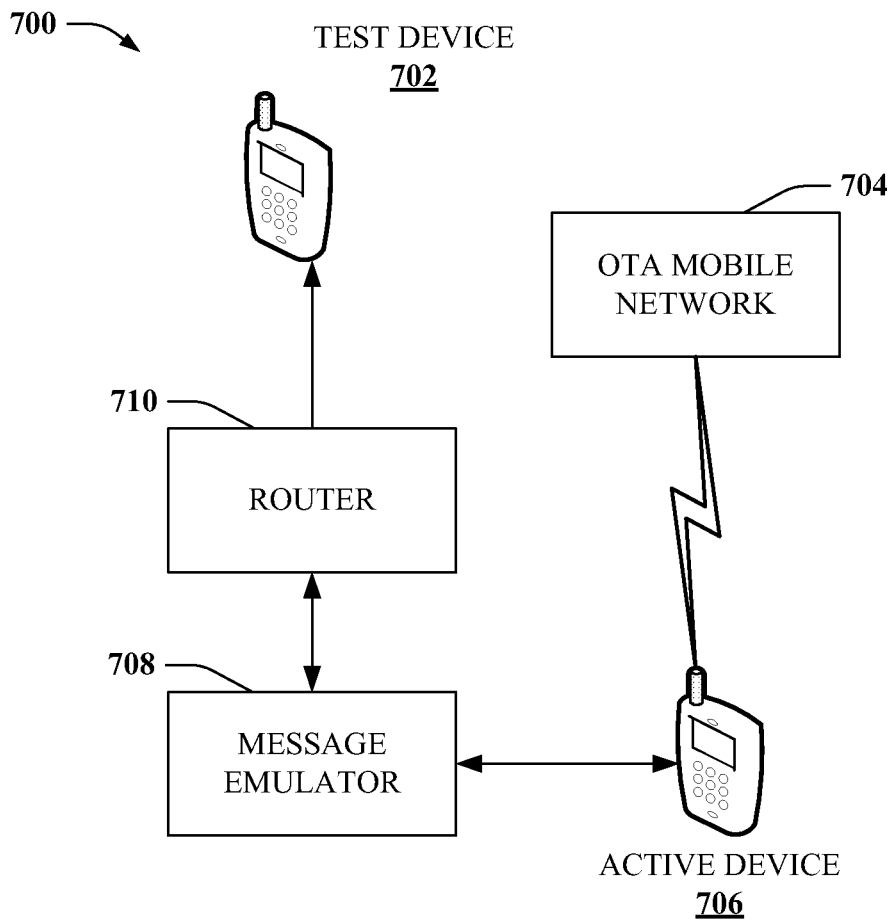
FIG. 7 illustrates a block diagram of an example system that provides emulated live over the air (OTA) messages for remote testing of network push messages.

FIG. 7 illustrates a block diagram of an example system 700 that can provide live over the air (OTA) messages and/or emulated messages for testing network push messages at a test device 702. Furthermore, the test device 702 need not be activated on a target network 704. Accordingly, the test device 702 can be located distant from the target network 704, reducing expense and time requirements associated with testing OTA messages at the test device 702.

Test device 702 can comprise a mobile communication device, a mobile phone, a cellular phone, such as a multi-mode cellular phone, 3G phone, 2G phone, or any combination thereof or of like devices configured at least for wireless communication. Message emulator 708 can monitor a mobile device 706 that is activated on an OTA mobile network. The active mobile device 706 can be any suitable device configured to at least receive OTA network push messages (e.g., broadcast push, unicast push) from OTA mobile network 704. The OTA network push message(s) can comprise a WAP push message, a notification message, such as a MMS, SMS, or e-mail message, a network alert, such as an error message, an e-mail inbox full message, or a combination thereof or of any other suitable network-initiated push message.

An OTA message received at the active device 706 from the OTA mobile network 708 can be identified by the message emulator 708. Message emulator 708 can then forward the OTA message to a router 710. Router 710 can be configured to transmit the OTA message via a data network, such as an intranet or the Internet, or other suitable data network. Test device 702 can receive the OTA message from router 710 via the data network. As one particular example, router 710 can test device 702 can both share a connection to the Internet. Identifying indicia suitable to route a data packet (e.g., comprising at least the OTA message) to the Internet connection associated with the test device 702 can be provided to router 710 (e.g., by the test device 702, uploaded to the router, uploaded to the message emulator 708, etc.).

An OTA message received at test device 702 can be utilized to analyze one or more client applications. For instance, a client application pertinent to the OTA message or data included in the OTA message can be executed because of receiving the OTA message. Execution of the client application can be compared with industry standards, or application parameters that control proper execution of the application, utilization of data pertinent to the application, or remote transmission and/or reception of such data, to test the client application. As described, test device 702 can couple to router 710 utilizing a data network. Accordingly, test device 702 can receive the OTA message at any suitable location connected to such data network (e.g., a test laboratory comprising an Internet connection). Furthermore, the test device itself need not be activated on the OTA mobile network 704 to obtain the OTA message, reducing time and expense associated with activating test devices on each network (704) desired for testing.

Figure 8:
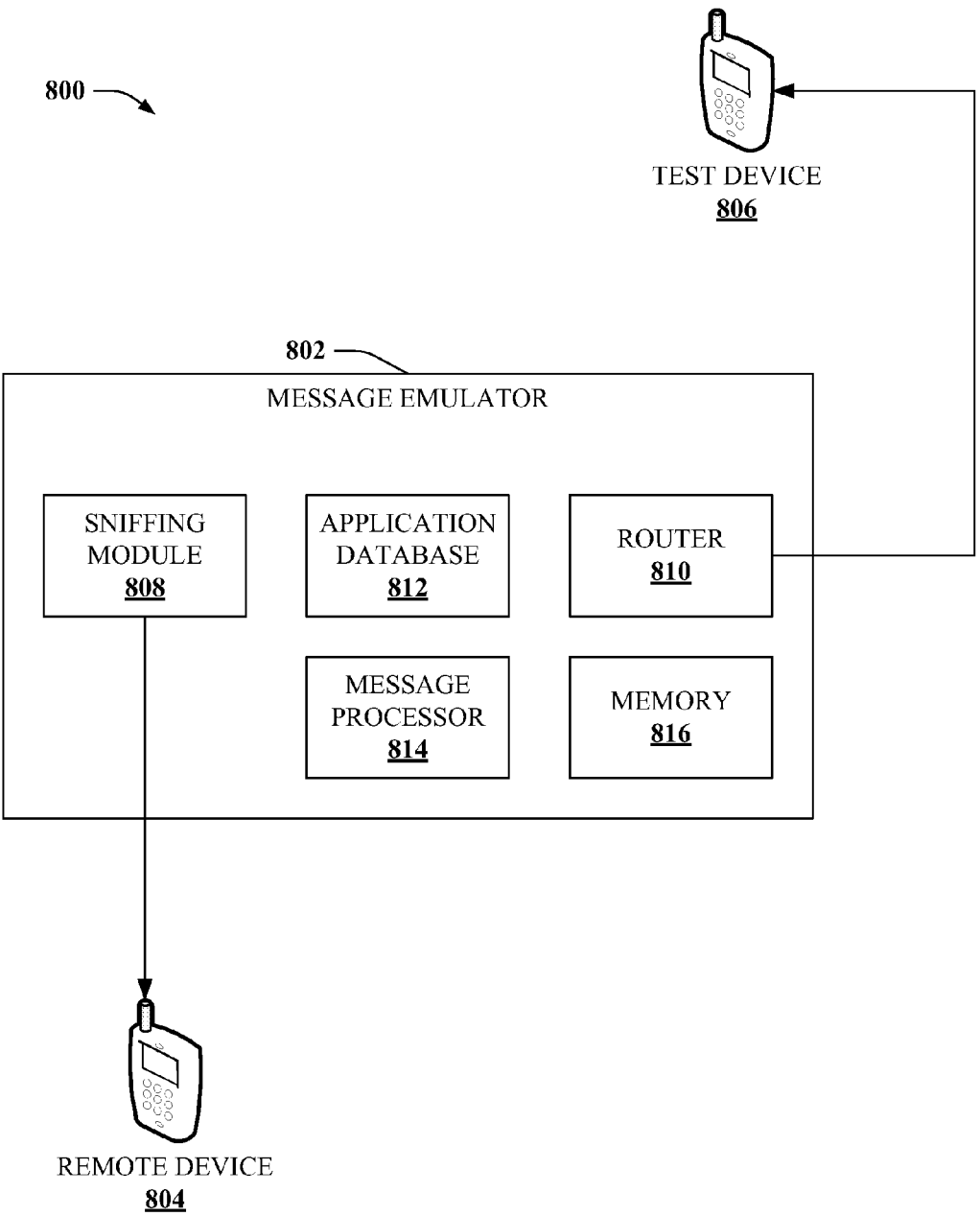
FIG. 8 depicts a block diagram of a sample system that provides message emulation for remote testing according to one or more aspects.

FIG. 8 depicts a block diagram of a sample system 800 that provides message emulation for remote testing according to one or more aspects. A message emulator 802 can monitor information received at a device 804 from a target mobile network (not depicted). If the information comprises an OTA mobile network message, the message emulator can store, modify, and/or forward the message to a test device 806. In some aspects, message emulator 802 can condition forwarding the OTA message on relatedness to a particular client application. Accordingly, in such aspects, only messages pertinent to a desired application under test can be submitted to the test device 806. System 800 therefore can provide OTA push messages to a remotely located device to facilitate testing such device with respect to the message of a particular mobile network. According to further aspects, test device 806 is not activated on the particular mobile network. Accordingly, system 800 can also facilitate testing an inactive device on the particular mobile network according to such aspects.

Message emulator 802 can include a sniffing module 808 configured to monitor the remote device 804 for messages received from an OTA mobile network. In addition, sniffing module 808 can identify a mobile network initiated push message (OTA push message) from the received messages. The OTA push message can be extracted from the remote device 804, or requested and received from the remote device 804, by the sniffing module 808. Further, the sniffing module 808 can provide the OTA push message to additional components (812, 814, 816, 818) of the message emulator 802 for further processing.

Message emulator 802 can further comprise an application database 812 configured to store information pertinent to identifying an application or device function associated with messages transmitted by an OTA network. A message processor 814 can receive an OTA push message from sniffing module 808 and reference the application database 812 to determine whether the OTA push message pertains to a selected application or device function. As an example, test device 806 can indicate to the message emulator 802 a particular client application, device function, or the like, under test. In another example, the client application or device function can be uploaded to the message emulator via a network interface (not depicted). In other aspects, the client application or device function can be pre-loaded into memory 816 associated with the message emulator 802.

Message emulator 802 can further comprise a router 810 configured to forward an OTA push message over an IP network to the test device 806. The router 810 can configure the OTA message so that it is compatible with IP network communication standards. Furthermore, the OTA push message can be configured to retain the payload of the OTA push message, as well as other portions of the OTA push message, including a header and tail portions and/or routing and addressing syntax associated with the particular mobile network, and so on. According to some aspects, router 810 can be configured to forward the OTA push message to the test device 806 only if the OTA push message pertains to a selected application or device function, as determined by the message processor 814. Accordingly, messages are forwarded to the test device 806 that are pertinent to an application or function under test.

In at least one aspect, message emulator 802 can comprise memory configured to store an OTA push message obtained by the sniffing module 808. Stored messages can be transmitted to test device 806 subsequent obtaining the message, for instance, or to a subsequent remote device (not depicted). Further, stored messages can be stored in memory 816 to facilitate additional processing by components (808, 810, 812, 814) of the message emulator 802. Accordingly, the message emulator 802 can receive additional test configuration information (e.g., pertaining to an additional client application or device function to be tested at test device 806) and identify a stored message (e.g., via message processor 814 and application database 812) suitable for performing the test.

Figure 9:
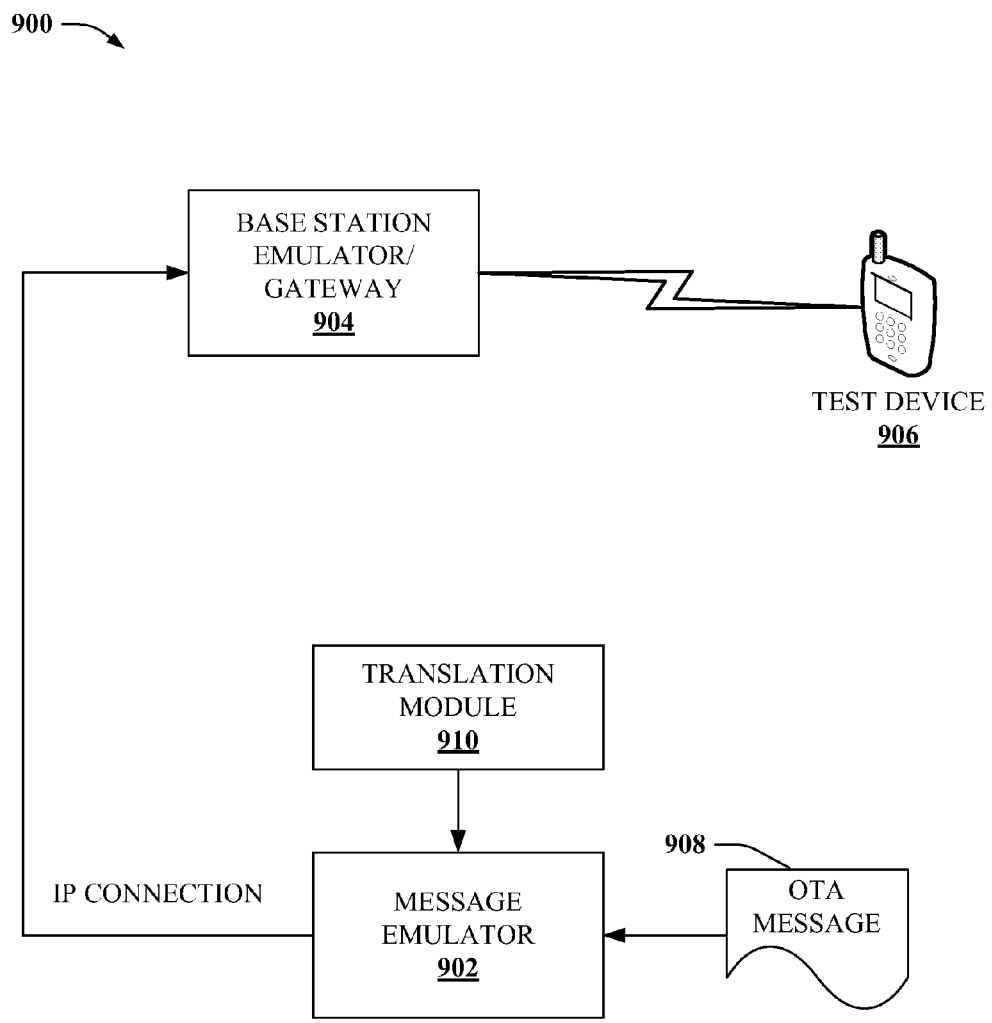
FIG. 9 illustrates a block diagram of an example system that provides an interface to forward push messages of a mobile network to a remote mobile device.

FIG. 9 illustrates a block diagram of an example system 900 that provides an interface for forwarding push messages (908) of a mobile network to a mobile device (906). The mobile device (906) can be located remotely from wireless access points of the mobile network and the mobile device can be inactive with respect to the mobile network. Furthermore, the mobile device (906) can utilize a wireless emulation device (904) to couple with the interface, and push messages (908) forwarded to the mobile device (906) can be configured for a wireless technology utilized by the emulation device (904). Accordingly, system 900 enables various message formats, configured for various interface technologies, to be tested at the mobile device (906).

System 900 can include a message emulator 902 that identifies and obtains an OTA message 908 delivered by a target mobile network to a mobile device that is activated on the target mobile network. System 900 can also include a wireless protocol translation module 910. The wireless protocol translation module 910 can be configured to translate the OTA message 908 into a format compatible with a particular wireless communication technology or wireless network architecture. For instance, the wireless protocol translation module 910 can be configured to update the OTA message 908 to include a suitable IP address or carrier-specific syntax to effect the translation.

As a specific example of the foregoing, the translation module 910 can configure the OTA message 908 to be compliant with a licensed cellular network, such as a UMTS network, a GSM/GPRS network, a CDMA or WCDMA network, and so on. Furthermore, the translation module 910 can configure the OTA message 908 to be compliant with a wireless NFC technology, a wireless Bluetooth technology, a wireless IP technology such as WLAN 802.11, a, b, g, n, etc., a WiMAX transceiver, or a combination thereof or of the like. In addition to the foregoing, translation module 910 can encapsulate the translated OTA message 908 into an IP data packet for transmission via an IP network (e.g., including an IP address of a terminating device, as well as header or tail information required by IP). The IP data packet can be forwarded to a base station emulator/gateway 904 that provides an IP interface to the test device 906.

Base station emulator/gateway 904 can comprise a mobile network base station, a base station emulator, or a wireless communication transceiver, or a combination thereof. The base station emulator/gateway 904 can be configured to interface the test device 906 to an IP network utilizing one or more wireless transmission functions of the test device 906 (e.g., licensed cellular transmission, WLAN 802.11 transmission, and so on). A suitable wireless communication transceiver can include a licensed cellular RF transceiver, an unlicensed IP RF transceiver, a wireless NFC transceiver, a Bluetooth transceiver, a WiMAX transceiver, or a combination thereof or of like wireless communication transceivers.

According to at least one aspect, the base station emulator/gateway 904 can comprise a PDSN or PDSN emulator. The PDSN or PDSN emulator can be configured to, at least in part, interface the test device 906 to the IP network. The PDSN or PDSN emulator can provide or simulate translation of IP compatible messages into wireless communication compatible messages, and vice versa.

Messages received at test device 906 can be utilized to test client applications or device functions pertinent to such messages. For instance, e-mail alerts and notifications, SMS and/or MMS alerts and notifications, and so on can be tested. Client application/device functions can be tested according to industry standards or particular parameters of the application or device. It should be appreciated that test device 906 does not need to be activated on a target mobile network to receive OTA push messages as described above. Accordingly, the test device 906 can utilize any suitable network connection to couple with the message emulator 902 (e.g., employing one or more base station or gateway emulation devices 904), and therefore can be located remote from traditional access points associated with the target mobile network. As a result, significant time and monetary expenses associated with testing mobile network push messages for new devices, operating systems, applications and/or software, or new aspects thereof (e.g., a software update), can be mitigated or avoided by system 900.

Figure 10:
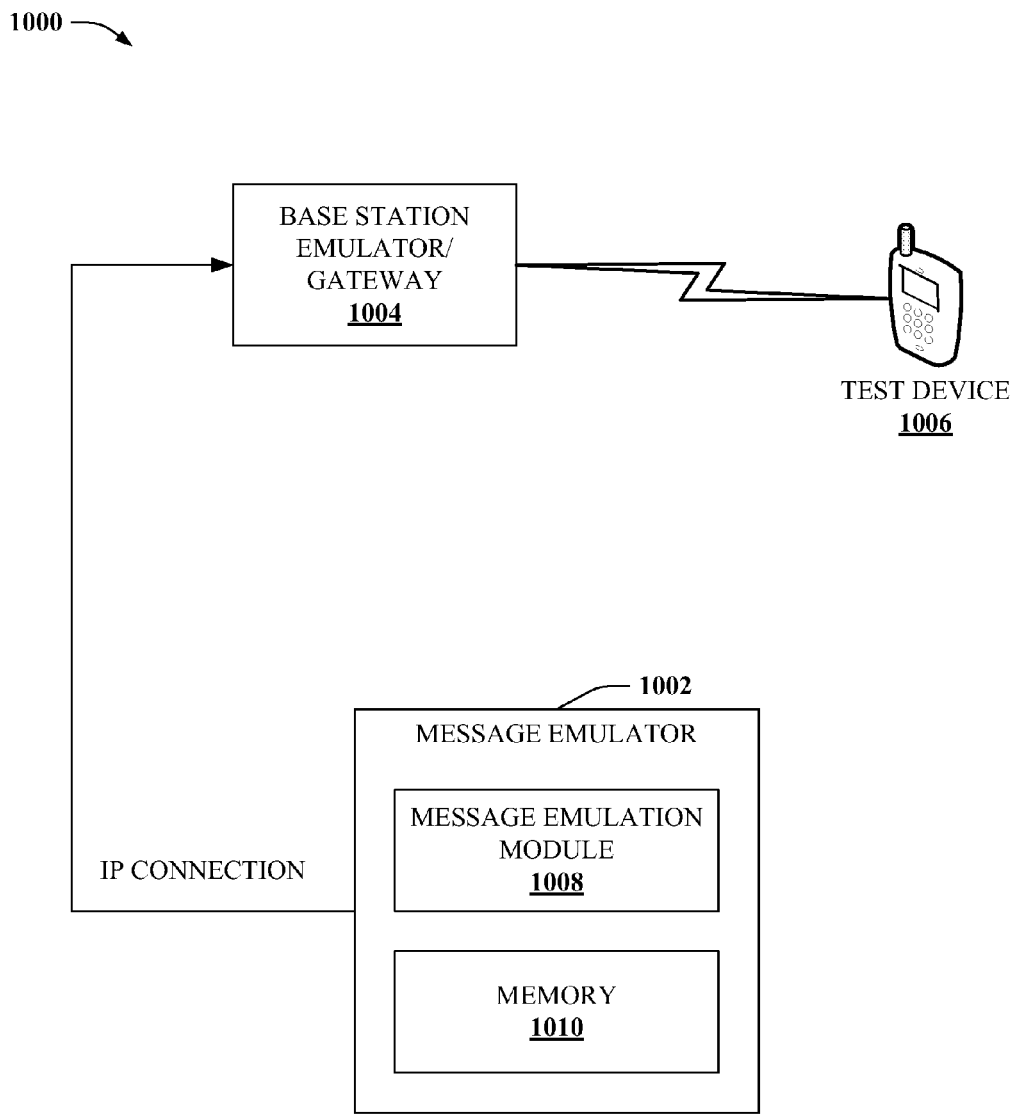
FIG. 10 depicts a block diagram of an example system that provides generation, modification and/or storage of OTA messages according to some aspects.

FIG. 10 depicts a block diagram of an example system 1000 that provides generation, modification and/or storage of OTA messages according to one or more aspects of the subject disclosure. System 1000 can comprise a message emulator 1002 that obtains and/or generates OTA messages for transmission a network interface (1004) associated with a mobile device 1006. The OTA messages can be utilized by the mobile device 1006 to analyze one or more applications or functions of the device. Message emulator 1002 can obtain live messages from a target OTA mobile network, or can generate simulated messages that include addressing and/or syntax related information associated with the target OTA mobile network. Accordingly, system 1000 can provide data in a format particular to requirements of one or more service provider's mobile networks.

System 1000 can further comprise a message emulation module 1008. The message emulation module 1008 can be configured to generate a message (e.g., an OTA message) having selected characteristics. The selected characteristics can be pertinent to a particular mobile network, for instance. Alternatively, or in addition, message emulation module 1008 can be configured to modify a live message received at a mobile device that is activated on the particular mobile network (e.g., an OTA network). The modified or generated messages can be configured to include error codes, system warnings, network non-compliance messages, and the like, that can be difficult to simulate with live messages provided directly from an OTA network. Such messages can be forwarded to the test device 1006 via an IP connection to a base station emulator/gateway 1004 coupled to the test device 1006. The test device 1006 can then execute and analyze applications related to the modified or generated messages.

According to additional aspects, message emulator 1002 can comprise memory 1010 utilized to store live messages, modified messages, and/or generated messages. In addition, memory 1010 can store configuration rules pertinent to modifying or generating such messages. Accordingly, once a particular message is configured and stored, the message can be referenced by message emulation module 1008 can forwarded to the test device 1006 as suitable.

Figure 11:
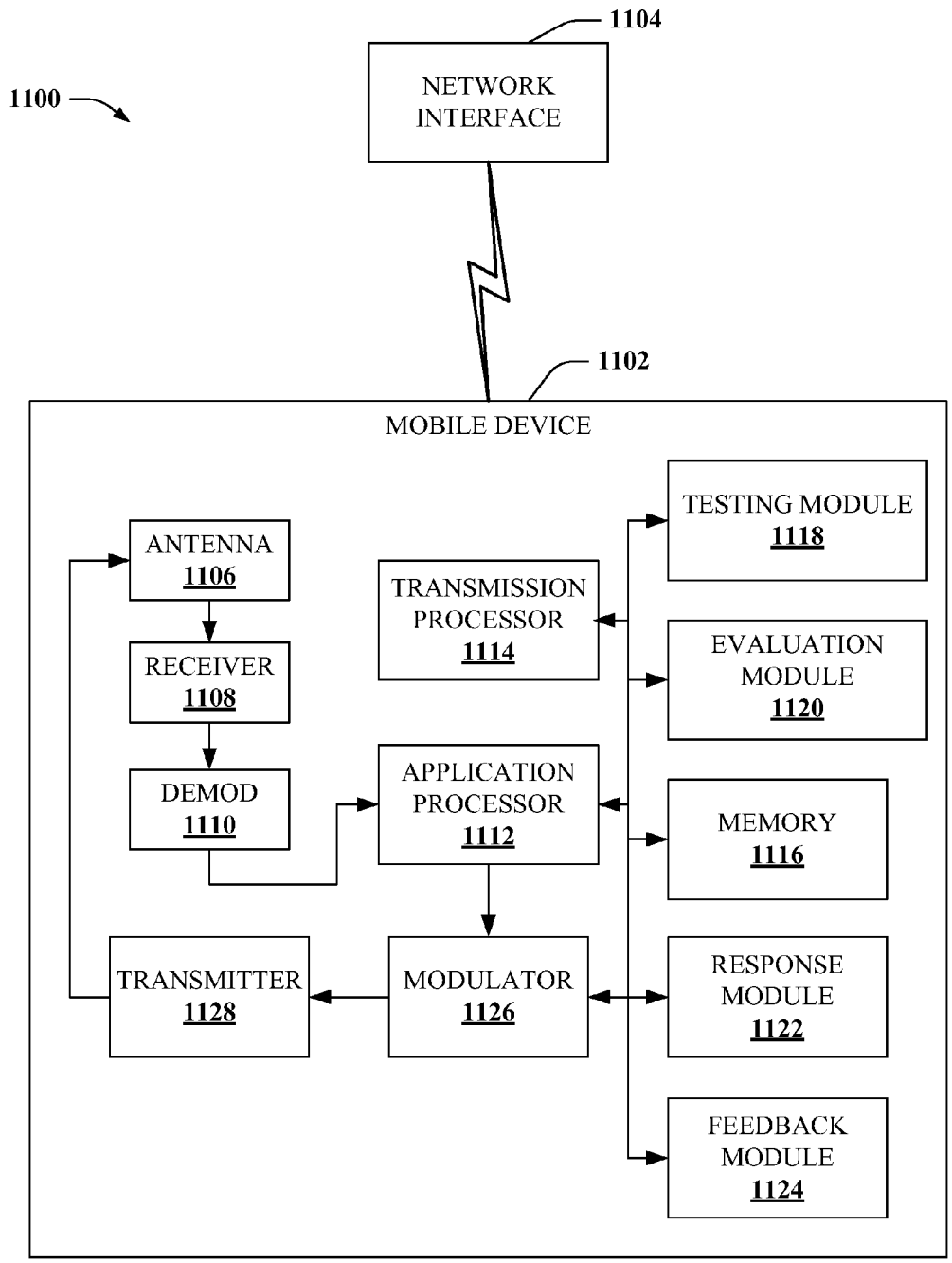
FIG. 11 illustrates a block diagram of a sample mobile device that can remotely test client applications based on received OTA messages.

FIG. 11 illustrates a block diagram of a sample system 1100 comprising a mobile device 1 102. The mobile device 1102 can test client applications based on received OTA messages remote from a network that provides the OTA messages. In addition, the mobile device 1102 can utilize a proxy device (1104) to configure messages delivered to the network. Accordingly, the mobile device 1102 can communicate remotely with the network even if not activated on such network, providing substantial flexibility for testing the mobile device 1102.

Mobile handset 1102 includes at least one antenna 1106 (e.g., a transmission receiver or group of such receivers comprising an input interface) that receives a signal (e.g., comprising data pertinent to a client application of mobile device 1102) and a receiver 1108, which performs typical actions (e.g., filters, amplifies, down-converts, etc.) on the received signal. Specifically, antenna 1106 and transmitter 1128 (collectively referred to as a transceiver) can be configured to couple to a wireless network or wireless network emulator. Antenna 1106, in conjunction with receiver 1108 and/or transmitter 1 128 can send and receive data utilizing a unicast pull message submitted to a remote mobile network (not depicted). In addition, antenna 1106, receiver 1108 and/or transmitter 1128 can receive a unicast push message or broadcast push message transmitted by the remote mobile network. In one example, antenna 1106 can be configured to receive an OTA message of an OTA mobile network, addressed by the OTA mobile network to a device (1104) activated on such network.

Antenna 1106 and receiver 1108 can also be coupled with a demodulator 1110 that can demodulate received symbols and provide them to an application processor 1112 for evaluation. Application processor 1112 can analyze information received by antenna 1106 and/or generate information for transmission by a transmitter 1128. Additionally, application processor 1112 can control and/or reference one or more components (1106, 1108, 1110, 1114, 11111, 1118, 1120, 1122, 1124, 11211, 1128) of the mobile handset 1102.

Further, application processor 1112 can execute one or more modules, applications, engines, or the like (1120, 1122, 1124) that comprise information or controls pertinent to executing functions of the mobile device 1102. As a particular example, the application processor 1112 can be configured to execute a client application related to a received OTA message. Execution of the client application can be based on receipt of the OTA message at the antenna 1106 and/or receiver 1108, for instance.

In one or more specific aspects, application processor 1112 can execute a client application pertinent to an emulated OTA message. The emulated OTA message can be a modified live message, or can be an artificially generated message including syntax, addressing information, or the like, of a target mobile network. In some aspects, the modified or generated message can be associated with system or network error messages, message alerts (e.g., an inbox full message of an e-mail application), and the like.

In addition, mobile handset 1102 can include a transmission processing module 1114 configured to receive an OTA message from a wireless network or wireless network emulator (1104). The OTA message can be a push message delivered by an OTA mobile network to a mobile device that is activated on the OTA mobile network, as described herein. Furthermore, the OTA message can be pertinent to, or can include data pertinent to, testing one or more client applications, functions, or software of the mobile device 1102.

According to further aspects, transmission processing module 1114 can be configured to communicatively couple to a network interface 1104 to, at least in part, access an IP network (e.g., an intranet, the Internet). For instance, the network interface 1104 can comprise a base station, a base station emulation network and/or a PDSN emulation network. In one specific aspect, the network interface can simulate various wireless access communication technologies, or network gateway technologies and protocols, enabling the mobile device 1102 to test applications utilizing such various access technologies.

Mobile handset 1102 can additionally include memory 1116 that is operatively coupled to application processor 1112. Memory 1116 can store data to be transmitted, received, and the like. Further, memory 1116 can store data pertaining to executing or analyzing client applications or device functions associated with a received OTA message.

Mobile device 1102 can include program modules (1118, 1120, 1122, 1124) pertinent to testing mobile device applications and sending or receiving data related to such applications or tests. A testing module 1118 can be configured to utilize a received OTA message to analyze a function, application, software, or firmware, or a combination thereof or of the like, of the mobile device 1102 (e.g., a test device, an experimental device, etc.). According to some aspects, the mobile device 1102 is not activated on the network that originated the OTA message. Accordingly, testing module 1118 can analyze device and application functionality with respect to data stored at a target network without being pre-activated on the target network.

According to further aspects, mobile device 1102 can include an evaluation module 1120 configured to determine whether an executed client application properly utilized information contained in a received OTA message. For instance, the evaluation module 1120 can be configured to determine whether the client application executes in accordance with a standard or an application parameter based on receipt of the OTA message. According to other aspects, evaluation module 1120 can be configured to determine whether the client application properly utilized information contained in an emulated OTA message (e.g., a modified live message or a generated message). For instance, a standard or application parameter pertinent to the emulated OTA message can be compared with execution of the client application or device function.

In addition to the foregoing, mobile device 1102 can include a response module 1122 configured to send a response over a wireless network or wireless network emulator (1104) to indicate receipt of a received OTA message. In addition, mobile device 1102 can also comprise a feedback module 1124 configured to generate, store, output, etc., results of executing a client application related to the OTA message. The execution and results can be based on receiving the OTA message.

Mobile handset 1102 can still further comprise a modulator 1126, and a transmitter 1128 that transmits generated signals (e.g., by application processor 1112 and modulator 1126) to, for instance, network interface 1104, a base station, a base station emulator, a wireless communication transmitter, an access point, another access terminal, a remote agent, etc. Although depicted as being separate from application processor 1112, it is to be appreciated that transmission processing module 1114 can be part of application processor 1112 or a number of processors (not depicted). As described, system 1100 provides a mobile device 1102 that can facilitate testing client applications, device functions and/or or device software based on OTA push messages of a target mobile network remote from the target mobile network and without being pre-activated on the target mobile network.

Figure 12:
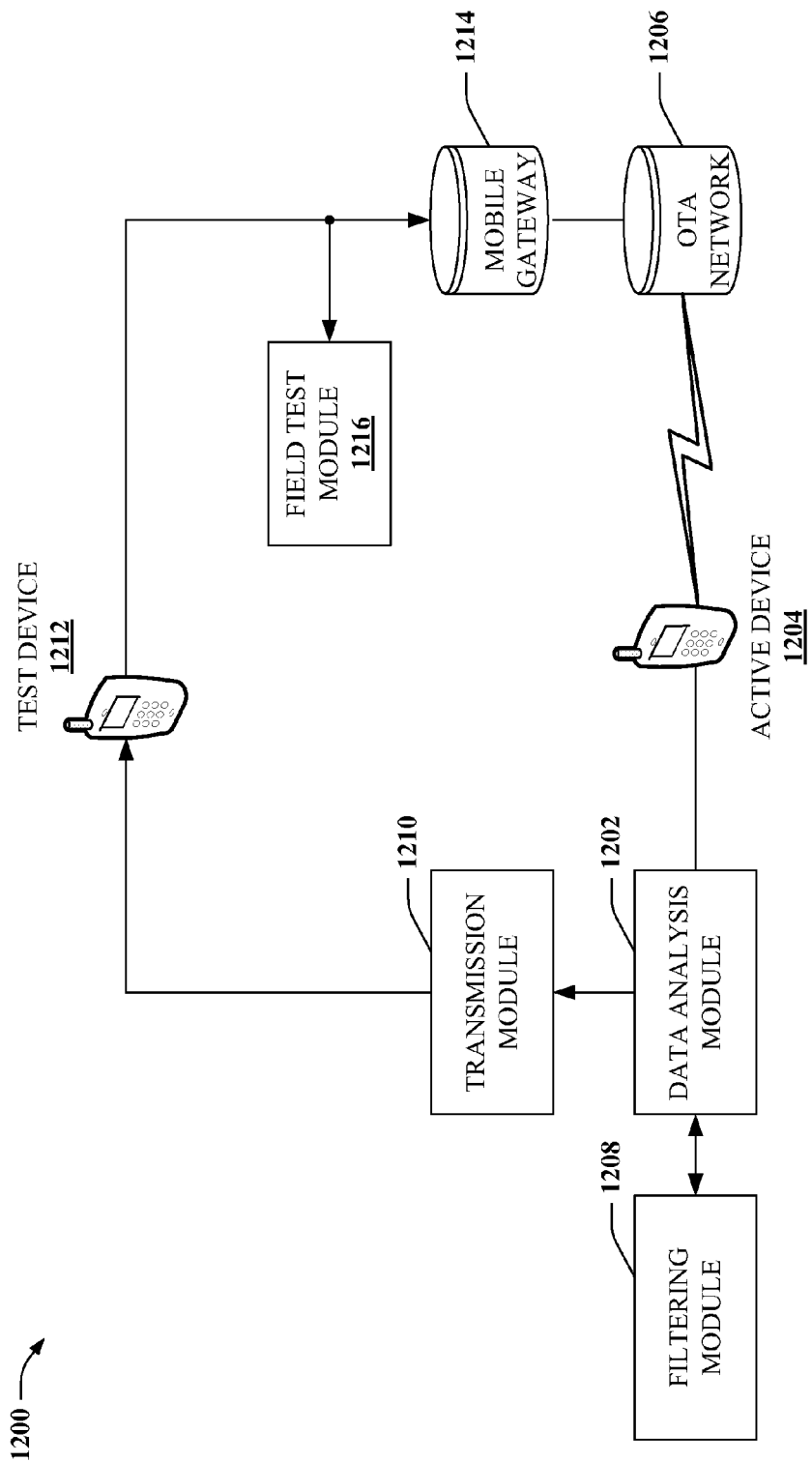
FIG. 12 illustrates a block diagram of an example system that provides an interface for network push and pull messages for a mobile device.

FIG. 12 illustrates a block diagram of an example system 1200 that provides a mobile device (1212), which is not activated on a mobile network (1206), with an interface to pull data from the mobile network (1206) and receive data pushed by the network (1206). In addition, the interface can comprise an IP network, enabling delivery of push or pull messages to the mobile device (1212) at any suitable connection to the IP network (e.g., an Internet connection). Accordingly, system 1200 can enable a test device 1212 to send data to and receive data from an OTA mobile network 1206 without utilizing OTA access points of such network 1206.

System 1200 can include a data analysis module 1202 configured to monitor data received at a mobile device 1204. The mobile device 1204 comprises a communication device configured to exchange data with an OTA mobile network 1206, such as a particular service provider's mobile network. Accordingly, mobile device 1204 is activated on the OTA mobile network 1206, and can be referred to as an active device (1204).

System 1200 can further include a filtering module 1208 configured to identify an OTA message that is received at the active device 1204. The filtering module 1208 can employ various standard and/or network-specific protocols or configurations to identify the OTA message. System 1200 can also include a transmission module 1210 configured to forward the identified OTA message to the test device 1212. In at least one aspect, test device 1212 is not activated on the OTA mobile network 1206, and such device 1212 could have a limited ability to communicate directly with the OTA mobile network 1206.

A connection between the transmission module 1210 and the test device 1212 can be any suitable remote connection. In one aspect, the connection is a wired and/or wireless IP connection (e.g., an Ethernet connection). In another aspect, the connection is an IP network (e.g., an intranet). In at least one other aspect, the connection is via the Internet. In another aspect, the connection utilizes a combination of the foregoing connections or like connections.

System 1200 also can include a field test module 1216 that monitors an IP gateway associated with the OTA mobile network for data originating from the test device, or associated with the test device. For instance, field test module 1216 could monitor the IP gateway for data packets having an origination address equal to that of the test device 1212. As another example, the field test module 1216 could monitor the IP gateway and determine whether any indicia identifying the test device 1212 is included within the data packet(s).

According to some aspects, field test module 1216 can configure a data packet originating at the test device 1212 and addressed to the OTA mobile network 1216 to be compatible with the OTA mobile network. For instance, the field test module 1216 can modify the data packet to include ID information (e.g., an originating IP address) of a device that is activated on the OTA mobile network 1206. In some aspects, the device that is activated on the network can be active device 1204. Additionally, the field test module 1216 can be configured to route the data packet to a component of the OTA mobile network (e.g., a destination device, such as an application server, WAP browser server, etc.).

According to still other aspects, field test module 1216 can be configured to identify at the IP gateway 1214 a data packet originated by the OTA mobile network 1206. In addition, the field test module can determine whether the data packet has a terminating address that coincides with an address of an active device (1204) or has some indicia identifying the test device 1212. Such a data packet can be routed by the field test module 1216 to the test device 1212. For instance, the field test module 1216 can be configured to update a terminating address of the data packet to coincide with a terminating address of the test device 1212. In one example, field test module 1216 can route the data packet to an IP interface (e.g., a base station, a PDSN, a wireless emulator, etc.) associated with the test device 1212.

As described, system 1200 can enable data to be passed between a test device 1212 and an OTA mobile network 1206. In addition, such data can include IP data, or OTA messages, or both. For instance, OTA messages received at an active device can be passed to the test device 1212, and IP messages originated at either the test device 1212 or the OTA mobile network 1206 can be routed through an IP gateway 1214 to either the device 1212 or network 1206. Accordingly, the test device can execute applications and perform device functions utilizing data stored at the OTA mobile network 1206 without being pre-activated on the OTA mobile network. Such a result can substantially reduce costs and delay associated with testing such device 1212.

Figure 13:
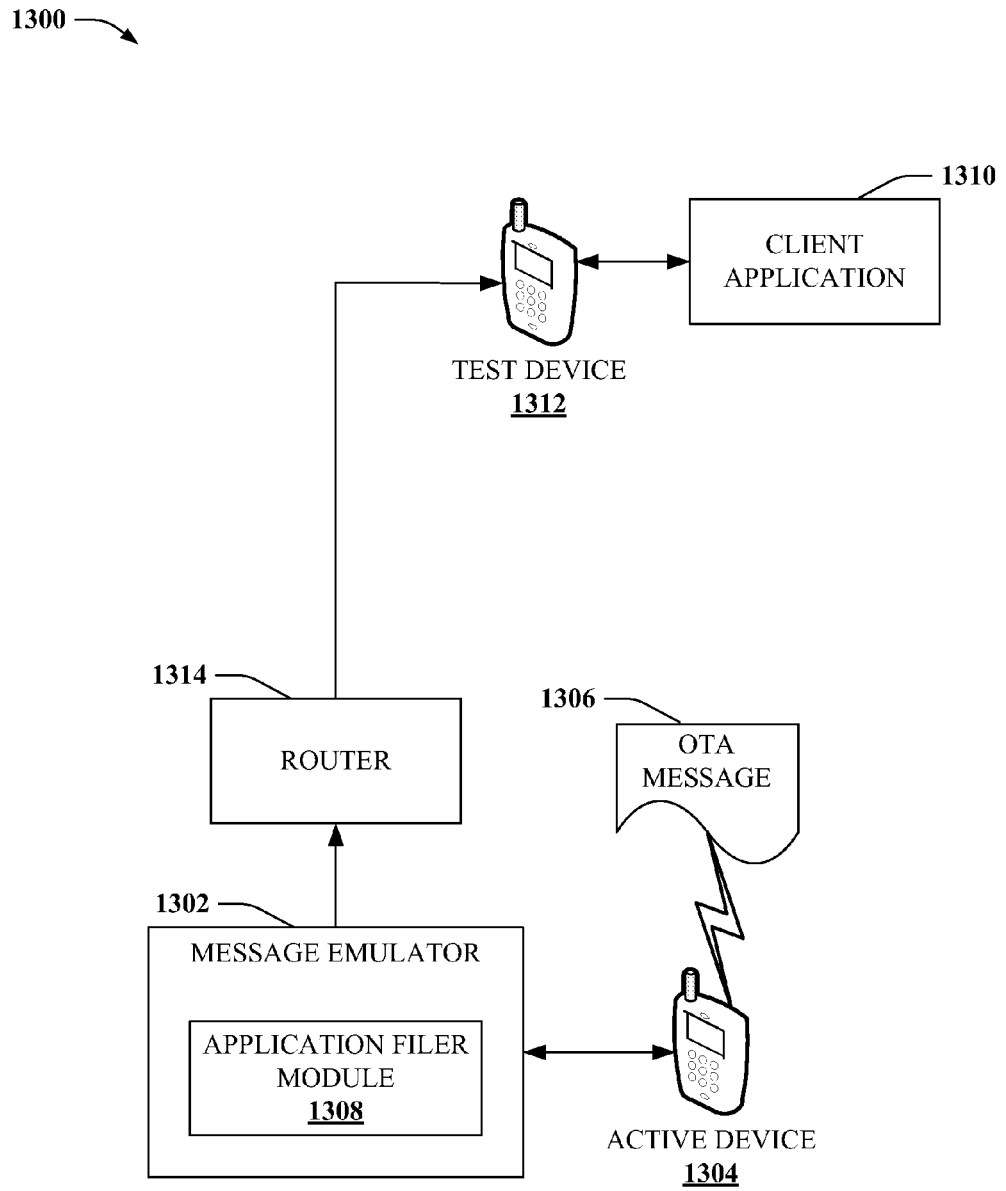
FIG. 13 depicts a block diagram of a sample system that provides an application-specific interface to network messages for an inactive mobile device.

FIG. 13 depicts a block diagram of a sample system 1300 that provides an application-specific interface to network messages (1306) for an inactive mobile device (1312). Specifically, system 1300 can include a message emulator that monitors an active mobile device 1304 for OTA messages 1306 received at the mobile device (e.g., from a target OTA mobile network). Additionally, system 1300 can include a router 1314 configured to forward received OTA messages 1306 to a test device 1312 via an IP-based connection (e.g., over the Internet, an intranet, etc.).

In addition to the foregoing, system 1300 can comprise an application filter module 1308. The application filter module 1308 can be configured to determine whether an OTA message 1306 received at the active device 1304 is pertinent to a selected mobile device application (e.g., client application 1310). In addition, the application filter module can be configured to condition forwarding the OTA message (e.g., by router 1314) to test device 1312 on whether the OTA message is pertinent to the selected mobile device application 1310.

Accordingly, system 1300 can selectively choose messages to be forwarded to the test device 1312, reducing transmission of unwanted data. Furthermore, application filter module 1308 can receive identifying information associated with a selected client application 1310, as well as rules, criteria, and/or indicia pertinent to identifying OTA messages associated with such application. Data received at the test device 1312 can be utilized to test execution of the client application 1310. Further, test device 1312 can send additional data requests to a mobile network that generated the OTA message(s), as described herein.

Figure 14:
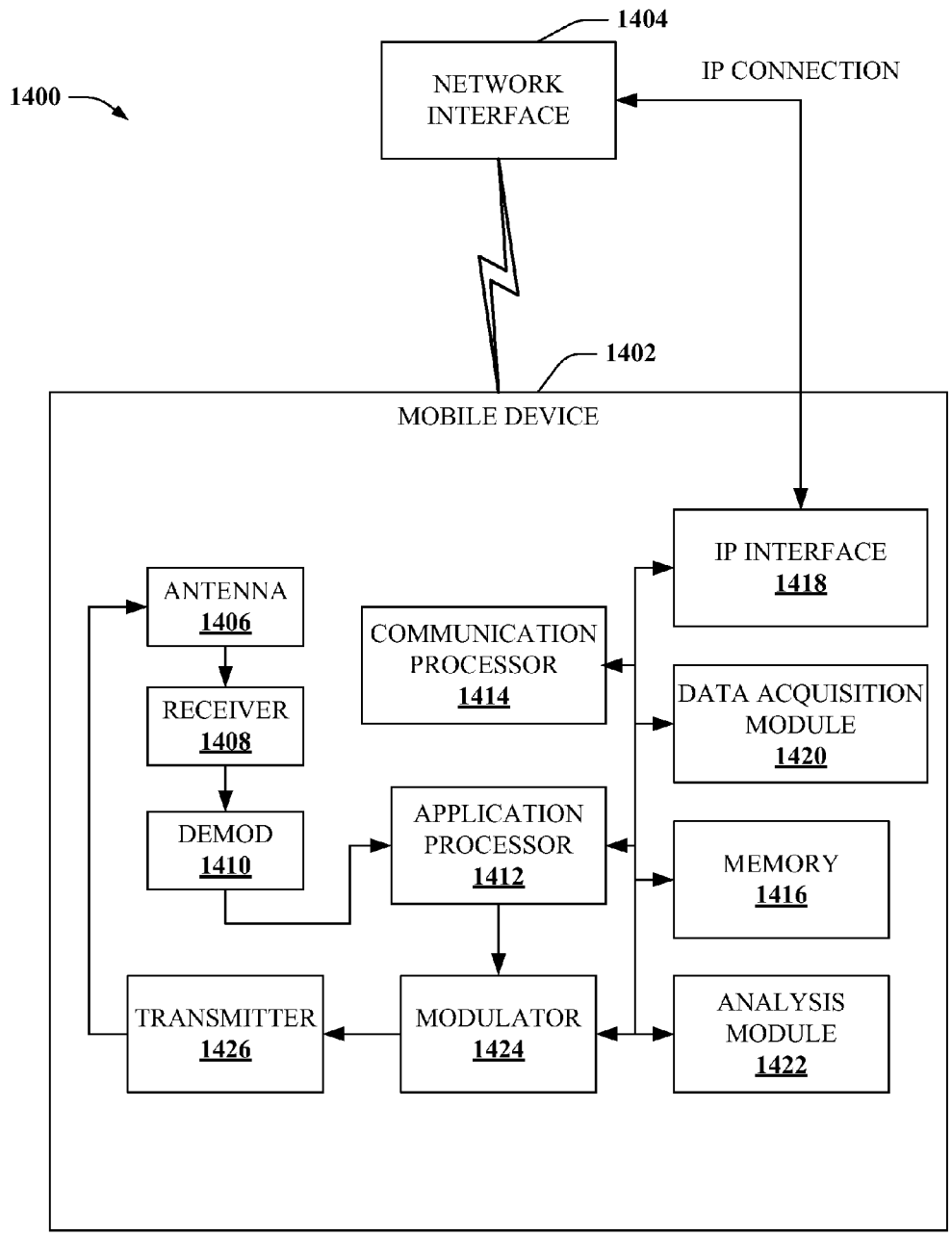
FIG. 14 illustrates a block diagram of an example mobile device that can test remote functions based on data sent to or received from a remote mobile network.

FIG. 14 illustrates a block diagram of a sample system 1400 comprising a mobile device 1402. The mobile device 1402 can test client applications based on OTA messages received from an OTA mobile network over an IP network interface (1404). In addition, the IP network interface (1404) can serve as a proxy device for data requests sent to the OTA mobile network and IP-based responses to such requests. Accordingly, the mobile device 1402 need not be activated on the OTA mobile network to exchange data with such network. Thus, as an example, mobile device 1402 can test an e-mail application that relies on data or network alerts provided by the OTA mobile network. For instance, mobile device 1402 can provide information to identify the tested e-mail application and/or OTA network messages associated with such e-mail application. As a result, mobile device 1402 can receive an OTA message comprising an alert. The alert can, for instance, indicate that an e-mail has been received for an e-mail account associated with the mobile device 1402. The mobile device can then send a request for data (e.g., the e-mail message) from the OTA mobile network over an IP network interface (1404), and obtain such data via the interface (1404).

Mobile handset 1402 includes at least one antenna 1406 (e.g., a transmission receiver or group of such receivers comprising an input interface) that receives a signal (e.g., an OTA message) and a receiver 1408, which performs typical actions (e.g., filters, amplifies, down-converts, etc.) on the received signal. Specifically, antenna 1406 and transmitter 1428 (collectively referred to as a transceiver) can be configured to communicatively couple an un-activated mobile handset (1402) to a wireless transmitter of an IP network (1404). Antenna 1406, in conjunction with receiver 1408 and/or transmitter 1428 can send and receive data utilizing a unicast pull message submitted to a remote mobile network (not depicted). In addition, antenna 1406, receiver 1408 and/or transmitter 1428 can receive a unicast push message or broadcast push message transmitted by the remote mobile network.

Antenna 1406 and receiver 1408 can also be coupled with a demodulator 1410 that can demodulate received symbols and provide them to an application processor 1412 for evaluation. Application processor 1412 can analyze information received by antenna 1406 and/or generate information for transmission by a transmitter 1428. Additionally, application processor 1412 can control and/or reference one or more components (1406, 1408, 1410, 1414, 1416, 1418, 1420, 1422, 1424) of the mobile handset 1402.

Further, application processor 1412 can execute one or more modules, applications, engines, or the like (1414, 1418, 1420, 1422) that comprise information or controls pertinent to executing functions of the mobile device 1402. As a particular example, the application processor 1412 can be configured to execute a client application at the un-activated mobile handset utilizing information pertaining to or contained within a received OTA message (e.g., received at the antenna 1406 and/or receiver 1408).

Mobile handset 1402 can additionally include memory 1416 that is operatively coupled to application processor 1412. Memory 1416 can store data to be transmitted, received, and the like. Further, memory 1416 can store data pertaining to executing or analyzing client applications or device functions associated with a received OTA message or data received from an OTA mobile network in response to a data request from mobile device 1402.

Mobile device 1402 can include additional processors, program modules, or the like (1414, 1418, 1420, 1422) pertinent to testing mobile device applications and sending or receiving data related to such applications or tests. A communication processor 1414 can be configured to receive, via the antenna 1406, an OTA message originated at a mobile network. According to some aspects, the mobile device 1402 is not activated on the network that originated the OTA message. Accordingly, communication processor 1414 can receive such messages without being pre-activated on the mobile network.

According to further aspects, mobile device 1402 can include an analysis module 1422 configured to determine whether an executed client application properly utilized information contained in a received OTA message. For instance, the evaluation module 1420 can be configured to employ the OTA message to test or adapt a function, application, software, or firmware, or a combination thereof, of the un-activated mobile handset to meet at least one specification. According to other aspects, analysis module 1422 can be configured to determine compliance of the execution of the client application with respect to a parameter of the client application (e.g., a predetermined testing parameter). For instance, a standard or application parameter pertinent to the emulated OTA message can be compared with execution of the client application or device function. In still other aspects, analysis module 1422 can be configure to audit operation of an executed client application, or a second client application of the un-activated mobile handset, with respect to a second OTA message, containing data stored at an application server or other network component, received from the OTA mobile network via the network interface 1404.

In addition to the foregoing, mobile device 1402 can include a data acquisition module 1422 configured to initiate a response to a received OTA message. For instance, the request can be generated by the data acquisition module 1422 to obtain data pertinent to a client application based on the received OTA message. The request for data can be included within the response, for instance. In some aspects, the data acquisition module 1422 can be configured to request an IP address of a device that is activated on the mobile network in regard to initiating the response. The IP address can be received by the communication processor 1414, which can couple the IP address with the response and route the response to the OTA mobile network. By coupling the IP address of the active device with the response, the response can be accepted by the OTA mobile network.

A response to a data request, which can comprise a second OTA message, an IP message, or a combination thereof, can provide data stored at a component of the OTA mobile network. The component can include, for instance, an application server, data storage server, and so on. Data in the response can be utilized by the mobile device 1402 to further test the client application.

Mobile handset 1402 can still further comprise a modulator 1424, and a transmitter 1426 that transmits generated signals (e.g., by application processor 1412 and modulator 1424) to, for instance, network interface 1404, a base station, a base station emulator, a wireless communication transmitter, an access point, another access terminal, a remote agent, etc. Although depicted as being separate from application processor 1412, it is to be appreciated that communication processor 1414 can be part of application processor 1412 or a number of processors (not depicted). As described, system 1400 provides a mobile device 1402 that can facilitate testing client applications, device functions and/or or device software based on OTA push messages of a target mobile network. The device (1402) can then initiate a pull message over an IP network interface 1404 to receive data from the target mobile network. Further, the pull message can be configured with an IP address of a device that is activated on the network, so the mobile handset 1402 need not be pre-activated. Accordingly, the pull and push data exchange can be conducted remotely from OTA access points of the mobile network.

Figure 15:
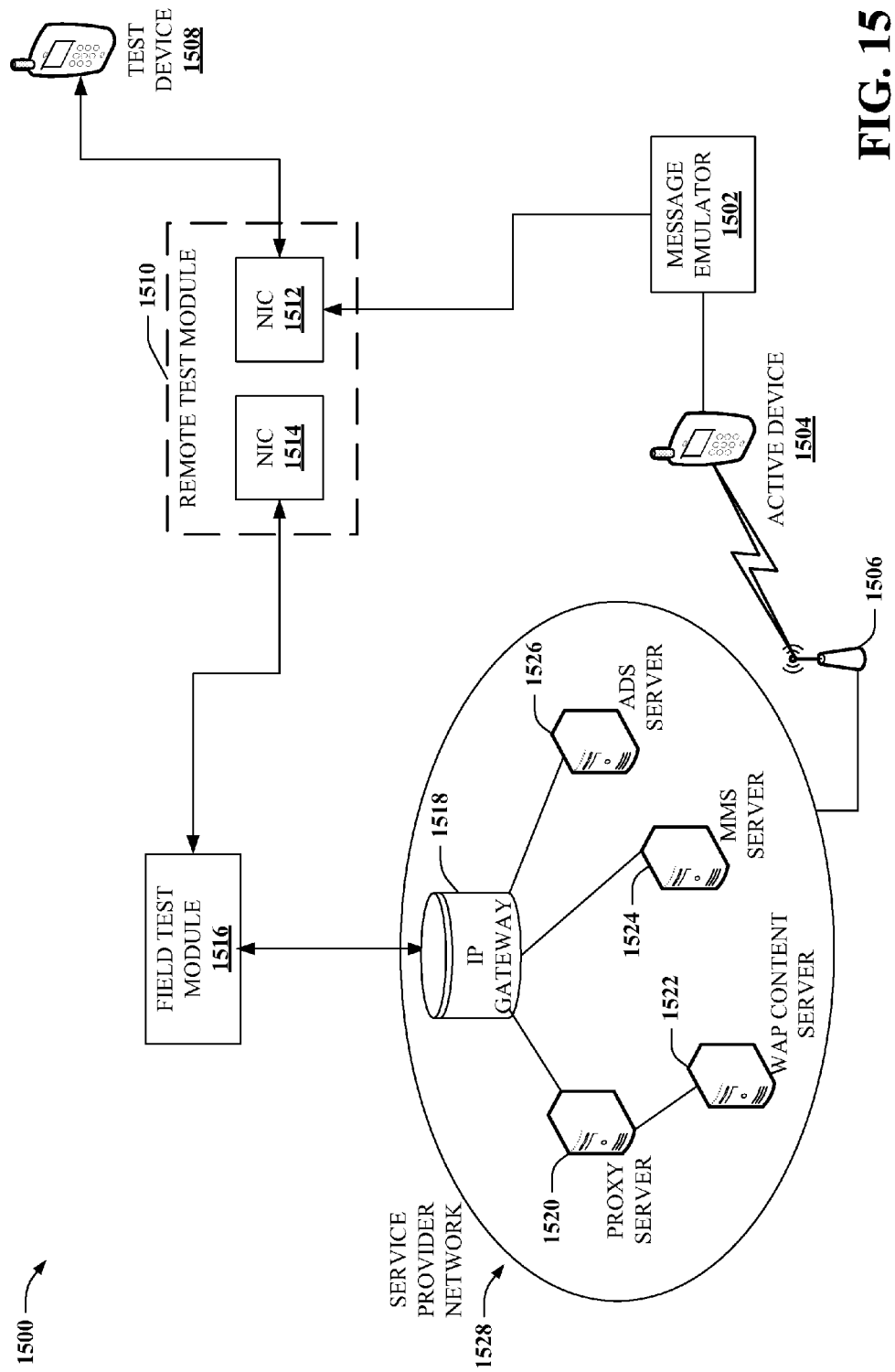
FIG. 15 illustrates a block diagram of a sample system that provides round trip data exchange for an inactive mobile device and a mobile network.

FIG. 15 illustrates a block diagram of a sample system 1500 that facilitates data exchange, including IP data and OTA message, for a test device 1508 and a mobile network 1528. The data exchange can be conducted utilizing any suitable remote network connection, such as a data network, a mobile network, or a global web such as the Internet. In at least one aspect, system 1500 can provide proxy service for the test device 1508, enabling the data exchange with the mobile network 1528 even if the test device 1508 is not activated on the network.

Message emulator 1502 can monitor data received at an active mobile device 1504 from a wireless transmitter 1506 (e.g., cellular base station) of the mobile network 1528. The active mobile device 1504 can be a cellular phone, mobile phone, multi-mode phone, laptop, PDA, or like mobile communication device. Particularly, the active mobile device 1504 is active on the mobile network 1528. In one aspect, activation on the mobile network comprises at least storing unique identifying indicia of the active device (1504) at the mobile network 1528, authorizing communication associated with such indicia, and inspecting inbound data to identify whether such data is authorized at the mobile network 1528.

Message emulator 1502 can identify an OTA message received at the active device 1504 from the mobile network 1528 (e.g., via wireless transmitter 1506). The OTA message can be a data message formatted by the mobile network 1528 and/or the wireless transmitter 1506 in compliance with a particular wireless communication standard, or in compliance with particular requirements of the mobile network 1528, or both. For instance, the OTA message can comply with a UMTS cellular OTA standard. In another example, the OTA message can include routing, addressing and/or other syntax peculiar to the mobile network 1528 or one or more similar networks (e.g., UMTS networks).

An OTA message identified at the active device 1504 can also be associated with a particular client application, device function and/or software at a test device 1508. The particular application/function/software or information utilized to associate the OTA message there with can be provided by the test device 1508 or uploaded by an operator (not depicted) to the message emulator 1502. Accordingly, message emulator 1502 can filter messages received at the active device 1504 and to identify messages pertinent to a desired test.

Message emulator 1502 can forward an identified OTA message from the active device 1504 to remote test module 1510, by way of a NIC 1512. The message emulator 1502 and NIC 1512 can be coupled via any suitable remote communication mechanism described herein or known in the art. NIC 1512 can further forward the OTA message to test device 1508.

According to some aspects, NIC 1512 can couple to test device 1508 utilizing one or more of various wireless transmission technologies. For instance, the NIC 1512 can couple to the test device 1508 utilizing a licensed cellular RF connection. In some aspects, the devices 1512, 1508 can be couple utilizing an un-licensed RF connection, such as a WLAN IP connection. In still other aspects, the devices 1512, 1508 can be coupled utilizing a short-range wireless communication system like Bluetooth or the like. In still other aspects, the devices 1512, 1508 can be coupled utilizing NFC communication. According to at least one aspect, the devices 1512, 1508 can be couple by way of a combination of the foregoing or of the like.

A message (e.g., the identified OTA message) forwarded by the message emulator 1502 to the test device 1508 can be configured for compatibility with a wireless connection between the test device 1508 and NIC 1512. Test device 1508 can execute one or more client applications related to a received message. The applications can be tested according to a communication standard, a client parameter, and so on. For instance, an OTA message comprising an OTA mobile network MMS message alert received at test device 1508 can result in execution of an MMS application displaying the alert at a user interface of the test device 1508.

Test device 1508 can send a data request in response to a received message. The data request can be routed to a component of the OTA mobile network 1528 and sent to the remote test module 1510. Remote test module 1510 can couple the test device 1508 to an IP network and forward the data request to the field test module 1516. Field test module 1516 can associate identifying indicia of a device activated on the OTA mobile network 1528 with such data request. In some aspects, the device activated on the OTA mobile network can be active device 1504. Additionally, the identifying indicia can comprise an IP address of an activated device. In at least one aspect, field test module 1516 can update an originating IP address of the data request to reflect the IP address of the activate device. In some aspects, field test module 1516 can update or modify the data packet to include message syntax or other information utilized by the OTA mobile network, to render the data request acceptable by the OTA mobile network. Once identifying indicia is associated with the data request, field test module 1516 can forward the data packet to the IP gateway 1518.

In addition to the foregoing, field test module 1518 can receive a message and/or data packet from the mobile OTA network 1528 (e.g., a response to a data request sent by the test device 1508). Such a message/data packet can be addressed to a device activated on the OTA mobile network that is associated with the field test module 1518. Field test module 1518 can route or re-route such a data packet to the field test module 1510. For instance, a terminating address of the data packet can be modified to reflect the test device 1508 or field test module 1510. In some aspects, field test module

1518 can re-route the data packet if it includes indicia identifying the test device 1508 and/or remote test module 1510. In other instances, any data packet addressed to the device activated on the OTA mobile network received at field test module 1518 can be re-routed.

As described, field test module 1518 facilitates remote communication via a remote network between the test device 1508 and OTA mobile network 1528 and components thereof (1518, 1520, 1522, 1524, 1526). Test device 1518 can utilize data received from the OTA mobile network, whether an OTA message or an IP data packet, or a combination thereof or of the like, to test device functionality. For instance, test device 1508 can execute one or more client applications, operating system functions and/or device functions based on data received from the OTA mobile network 1528. The execution of applications/functions can be tested with respect to one or more standards or parameters that measure proper or expected execution or execution results. Accordingly, system 1500 enables a non-active device (1508) to communicate with OTA mobile network 1528 from any suitable remote location (e.g., coupled to an IP network connection) to test client and device functionality utilizing the network 1528.

The aforementioned systems have been described with respect to interaction between several components, modules and/or electronic interface functions. It should be appreciated that such systems and components/modules/functions can include those components or sub-components specified therein, some of the specified components or sub-components, and/or additional components. For example, a system could include field test module 102, interface module 108, remote test module 402, NIC 410, and emulator 404, or a different combination of these and/or other components. Sub-components could also be implemented as components communicatively coupled to other components rather than included within parent components. Additionally, it should be noted that one or more components could be combined into a single component providing aggregate functionality. For instance, field test module 512 can include remote testing module 506, or vice versa, to facilitate identifying data at an IP gateway pertinent to a test device, and coupling the test device to a network by way of a single component. The components may also interact with one or more other components not specifically described herein but known by those of skill in the art.

Furthermore, various portions of the disclosed systems can include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, and in addition to that already described herein, can automate certain mechanisms or processes performed thereby to make portions of the systems more adaptive as well as efficient and intelligent.

It is to be understood that the embodiments described herein can be implemented in hardware, software, firmware, middleware, microcode, or any combination thereof. For a hardware implementation, the processing units can be implemented within one or more ASICs, DSPs, digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Referring to FIGS. 16-24, methodologies relating to facilitating remote testing of network-related mobile device applications and functionality are provided. While, for purposes of simplicity of explanation, the methodologies are shown and described as a series of acts, it is to be understood and appreciated that the methodologies are not limited by the order of acts. For example, in accordance with one or more aspects, some acts can occur in different orders and/or concurrently with other acts from that shown and described herein. In addition, those skilled in the art will understand and appreciate that a methodology could alternatively be represented as a series of interrelated states or events, such as in a state diagram. Moreover, not all illustrated acts are necessarily required to implement a methodology in accordance with one or more aspects.

Figure 16:
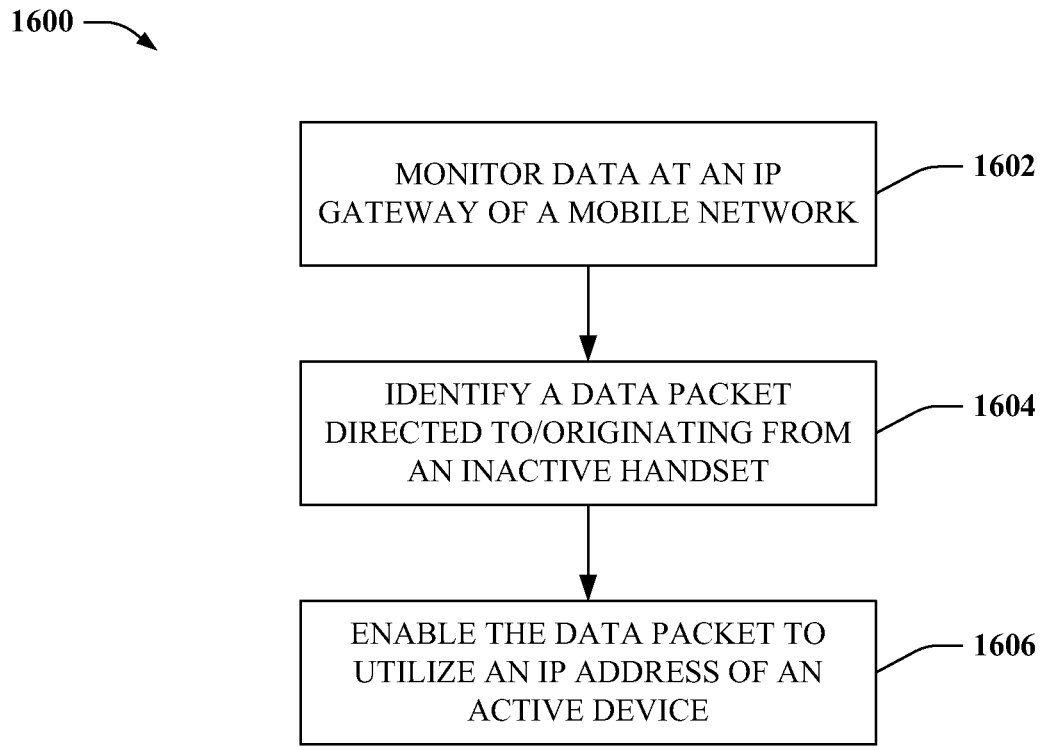
FIG. 16 illustrates a sample methodology for providing remote field testing of a mobile device with respect to a mobile provider's network.

FIG. 16 illustrates a sample methodology 1600 for facilitating remote field testing of a mobile device with respect to a mobile provider's network. Field testing can be accomplished via data exchange between the mobile device and the mobile provider's network. In addition, the mobile device need not be activated on the mobile provider's network. Accordingly, any suitable network interface can be utilized to affect the data exchange, including an IP network.

At 1602, method 1600 can monitor data at an IP gateway of a mobile network. The mobile network can be any network of a mobile communication service provider (e.g., cellular provider, wireless IP provider). The IP gateway provides an interface for the mobile network to an IP data network, such as the Internet. Data routed via the IP data network can access components of the mobile network through the IP gateway. In addition, the mobile network can send data to devices coupled with the IP data network via the IP gateway.

At 1604, method 1600 can identify a data packet at the IP gateway that is directed to or originates from the mobile handset, or otherwise contains indicia identifying the mobile handset. In at least some aspects, the mobile handset is not activated on the mobile network. At 1606, method 1600 can enable the data packet to utilize identifying indicia (e.g., an IP address, MAC address, and/or the like) associated with a device that is activated on the mobile network if the data packet originates at the mobile handset. For instance, an originating address of the data packet can be updated to reflect the identifying indicia associated with the device that is activated on the mobile network. Accordingly, the data packet can be accepted and utilized by the mobile network.

Figure 17:
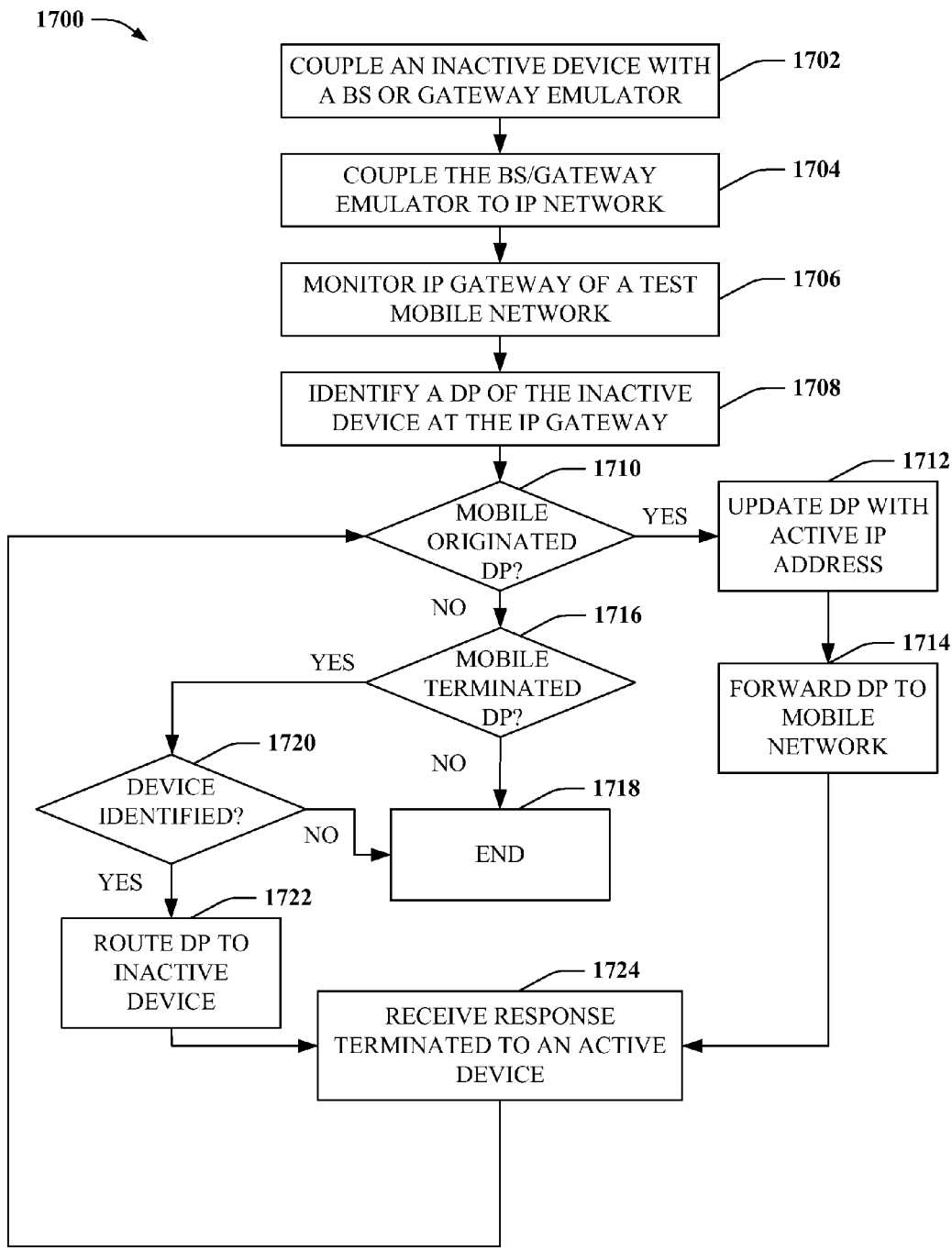
FIG. 17 depicts an example methodology for conducting remote field testing of client applications on an inactive test device with a mobile network.

FIG. 17 depicts an example methodology 1700 for conducting remote field testing of client applications of a test mobile device. The remote field testing can involve data stored at components of a mobile network. In addition, the testing can be accomplished outside the wireless range of OTA access points of the mobile network. For instance, a data network such as the Internet can be utilized to facilitate the testing. Accordingly, method 1700 can provide substantial reduction in cost and time associated with testing new mobile devices, device applications, and the like, by enabling such testing by way of a remote network connection such as the Internet.

At 1702, method 1700 can couple an inactive test device with a base station or gateway emulator. At 1704, the base station or gateway emulator can be communicatively coupled with an IP network. Accordingly, the test device can send and receive data via the IP network utilizing the base station or gateway emulator.

At 1706, an IP gateway of a mobile network, connected to the IP network, can be monitored. For instance, the IP gateway can be monitored for data originating from or addressed to the test device, or containing indicia suitable to identify the test device with respect to other devices coupled with the IP network. In some aspects, the indicia can comprise an IP address, a MAC address, or a like identifier. In other aspects, the indicia can comprise a number, function, code, or the like, associated with the test handset.

At 1708, a data packet can be identified at the IP gateway that is associated with the test device. At 1710, a determination can be made as to whether the data packet originates at the test device. If the data packet is determined to have originated at the test device, method 1700 can proceed to 1712. Otherwise, method 1700 can proceed to 1716.

At 1712, the data packet can be updated with an IP address of a device that is active on the mobile network. At 1714, the data packet can be forwarded to the mobile network. Method 1700 can proceed from reference number 1714 to reference number 1724.

At 1716, a determination is made as to whether the data packet is terminated at the mobile device. In some aspects, the determination at 1716 can identify whether the data packet is terminated at the IP address of the device that is active on the mobile network. If the data packet is not terminated at the test device, or the IP address of the active device, method 1700 can proceed to 1718 where the methodology 1700 terminates. If the data packet does terminate at the test device, or the IP address of the active device, method 1700 can proceed to 1720.

At 1720, method 1700 can determine whether the test device is identified by information within the data packet. If not, method 1700 can proceed to 1718 and terminate. If the test device is identified within the data packet, method 1700 can proceed to 1722 where the data packet can be routed to the test device, which is not activated on the mobile network. At 1724, a data packet that includes a response to a message routed to the mobile network can be received. Method 1700 can then return to reference number 1710. As described, method 1700 can facilitate data exchange between a mobile network and a device that is not activated on the mobile network, by way of a data network such as the Internet or a like remote IP network.

Figure 18:
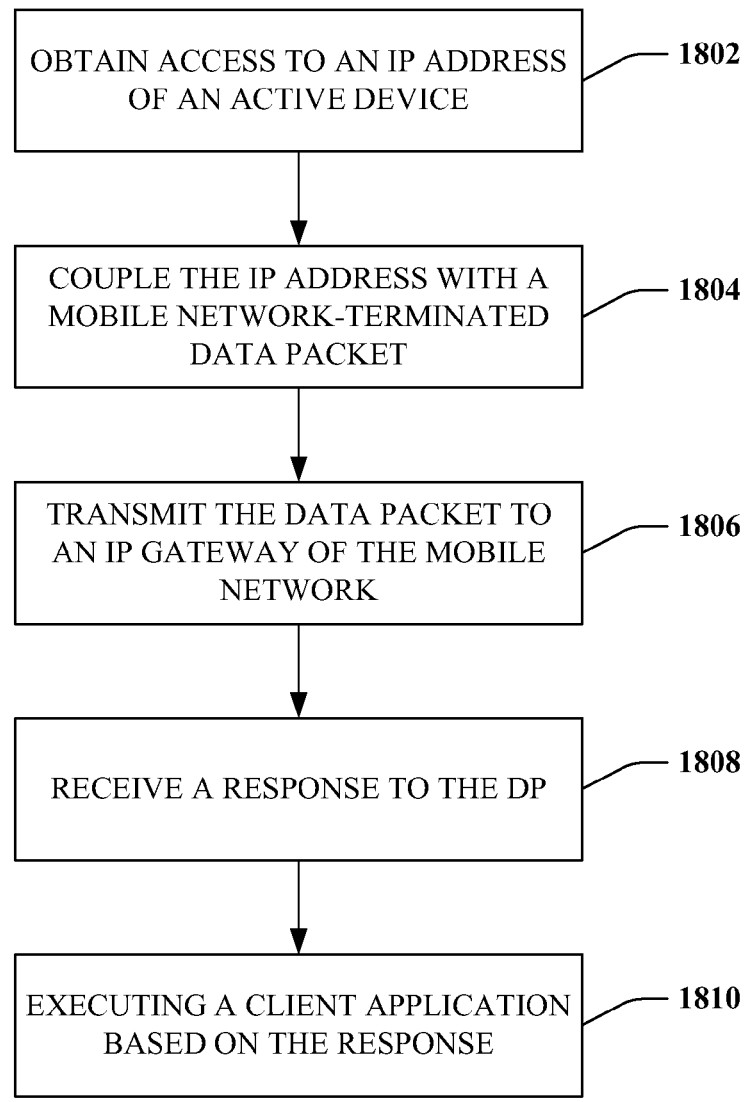
FIG. 18 illustrates a sample methodology for remotely interfacing with a mobile network to conduct application-based data exchange according to aspects.

FIG. 18 illustrates a sample methodology 1800 for remotely interfacing with a mobile network to conduct application-based data exchange according to aspects. At 1802, method 1800 can access an IP address of a device that is activated on a mobile network, as described herein. At 1804, the IP address can be coupled with a mobile network terminated data packet. At 1806, the mobile terminated data packet can be transmitted over an IP network to a component of the mobile network. At 1808, a response to the data packet can be received. At 1810, a client application can be executed based on the response, or based on data included within the response. As described, method 1800 can facilitate testing mobile applications or device functionality utilizing data stored at the mobile network. Furthermore, the device need not be activated on the mobile network. Data exchange can be conducted utilizing any suitable IP network that communicatively couples the mobile device with the device that is activated on the mobile network.

Figure 19:
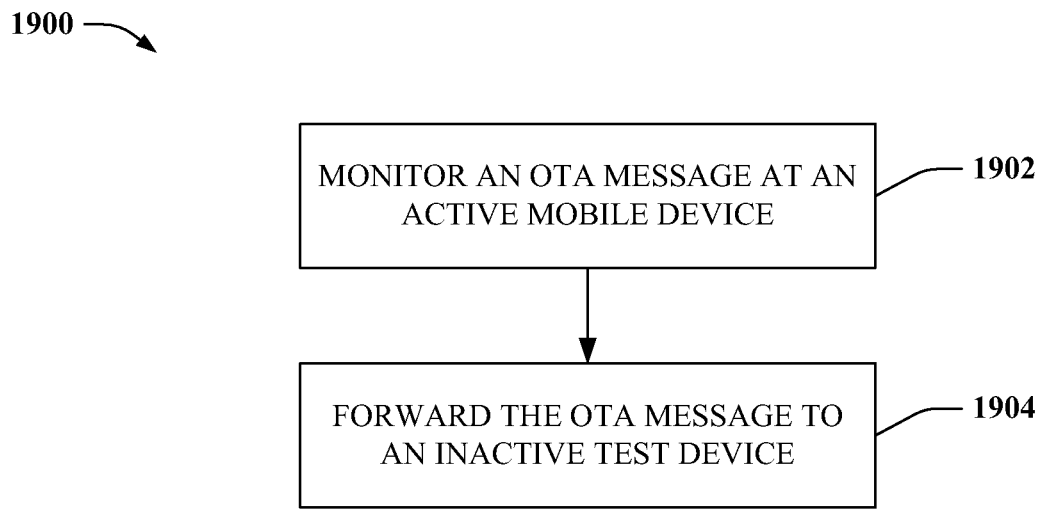
FIG. 19 depicts an example methodology for providing mobile network push messages to an inactive mobile device according to aspects.

FIG. 19 depicts an example methodology 1900 for providing mobile network push messages to an inactive mobile device according to aspects of the subject disclosure. At 1902, method 1900 can monitor an OTA message received at a mobile device from an OTA mobile network. The mobile device can be any suitable device configured at least to receive data from the OTA mobile network. For instance, the mobile device can be a wireless communication device that is activated on the OTA mobile network. The OTA message can comprise data pertinent to one or more client applications or device functions of the mobile device. Furthermore, the OTA message can comprise syntax, routing information or the like particular to the OTA mobile network. In addition, the OTA message can be configured for transmission on a licensed cellular network, such as a UMTS network, GSM network, CDMA network, TDMA network, or another suitable cellular network technology or a combination thereof.

At 1904, the OTA message can be forwarded to a test handset that is not activated on the OTA mobile network. The OTA message can be forwarded by way of a data network, such as an intranet, the Internet, or an ad hoc wired connection, or a suitable combination thereof. The test handset can utilize the OTA message to test a client application or function of the test handset. A result of the test can be generated and compared to a communication standard or a parameter of the client application or device function. As described, method 1900 can facilitate obtaining an OTA message and forwarding the message to a device that is not activated on a network that originates the OTA message. Accordingly, the device can be located remote from access points of the originating network, enabling costs associated with testing to be reduced or avoided.

Figure 20:
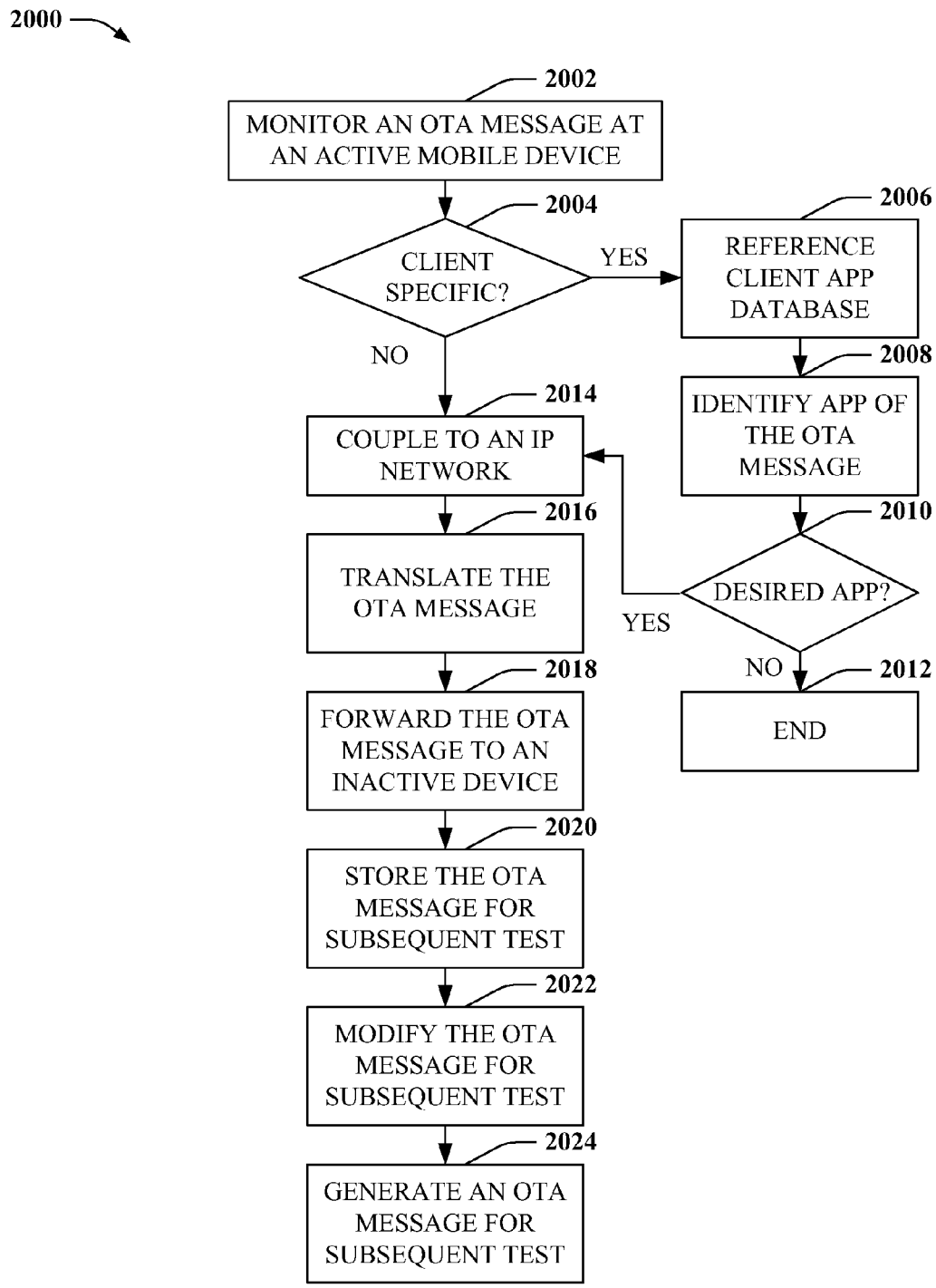
FIG. 20 illustrates a sample methodology for providing for forwarding or generating OTA network messages to test applications of an inactive mobile device.

FIG. 20 illustrates a sample methodology 2000 for providing for forwarding or generating OTA network messages to test applications of a mobile device. At 2002, method 2000 can monitor data at a mobile device that is activated on a target OTA network for a received OTA message, as described herein. At 2004, a determination can be made as to whether an application specific OTA message is requested for testing a test mobile device. If an application specific message is requested, method 2000 can proceed to 2006. If an application specific message is not requested, method 2000 can proceed to 2014.

At 2006, a database containing information pertinent to one or more client applications can be referenced. At 2008, a client application(s) associated with the OTA message can be identified by referencing the information contained within the database. At 2010, a determination is made as to whether the identified client application(s) is the requested application. If the application is not the requested application, method 2000 can proceed to 2012 and terminate. If the application is the requested application, method 2000 can proceed to 2014.

At 2014, method 2000 can communicatively couple to an IP network. At 2016, the OTA message can be translated into a format compatible with the IP network. In some aspects, the OTA message can be further translated into a format compatible with an interface to the IP network associated with a test mobile device. At 2018, the OTA message or translated OTA message can be forwarded to the test mobile device. In some aspects, the test mobile device can be inactive with respect to the OTA network that originates the OTA message.

At 2020, the OTA message can be stored for subsequent testing. For instance, the stored OTA message can be forwarded to a subsequent test device, or to the test mobile device for subsequent consumption. In some aspects, a translation of the OTA message (e.g., incorporating a format compatible with the IP network or an interface utilized by the test mobile device) can be stored. At 2022, the OTA message can be modified for subsequent testing. In at least one aspect, the OTA message can be modified to include an error message, service unavailability message, or other error associated with a system, application, or function of a test device. At 2024, method 2000 can generate an OTA message. The generated OTA message can comprise formats suitable for an IP network and/or wireless interface utilized by the test device.

Figure 21:
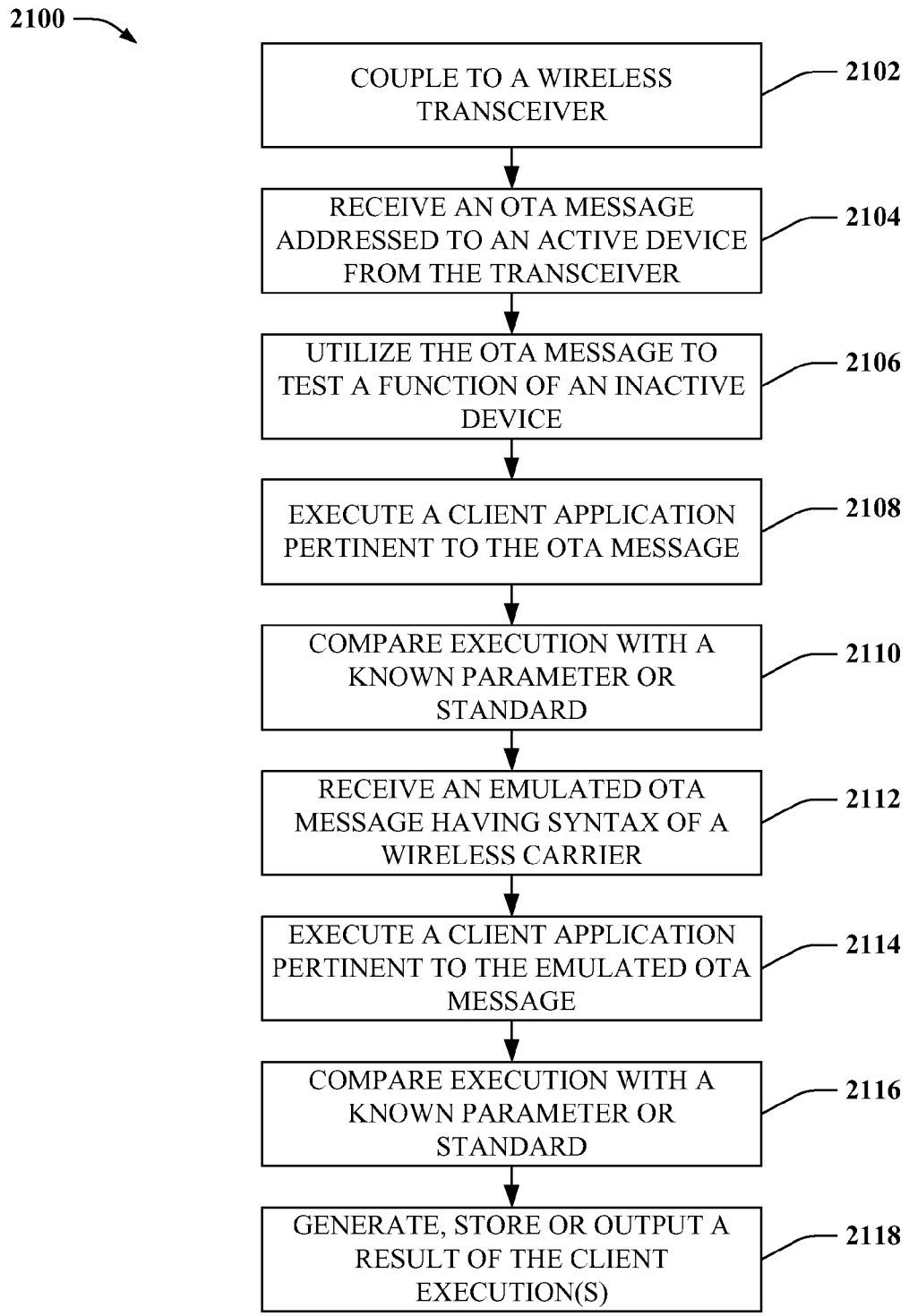
FIG. 21 depicts an example methodology for providing mobile device client tests remote from OTA access to a mobile network according to some aspects.

FIG. 21 depicts an example methodology 2100 for providing mobile device client testing remote from OTA access to a mobile network. At 2102, method 2100 can couple to a test handset to a wireless transceiver. The wireless transceiver can comprise a licensed cellular frequency transmitter (e.g., GSM/GPRS, UMTS, CDMA, W-CDMA), an unlicensed frequency transmitter (e.g., WLAN), a WiMAX transmitter, a Bluetooth transmitter, or an NFC transmitter, or a like wireless transmitter, or a combination thereof. At 2104, an OTA message addressed to a device that is activated on an OTA mobile network can be received. At 2106, the OTA message can be utilized to test a function of a device that is not active on the OTA mobile network.

At 2108, a client application pertinent to the OTA message can be executed. At 2110, execution of the client application can be compared to a known parameter associated with the client application, a wireless communication standard, or a combination thereof. At 2112, an emulated OTA message having syntax particular to the OTA mobile network can be received. The emulated OTA message can be generated by a message emulation device, or can be a live OTA message that is modified by such a device. At 2114, the client application (or, e.g., a second client application pertinent to the emulated OTA message) can be executed. At 2116, execution of the client application (or second client application) can be compared to a known parameter of the client application, or a known industry standard associated with the client application(s). At 2118, a result of the execution of the client application or second client application can be generated, stored and/or output.

Figure 22:
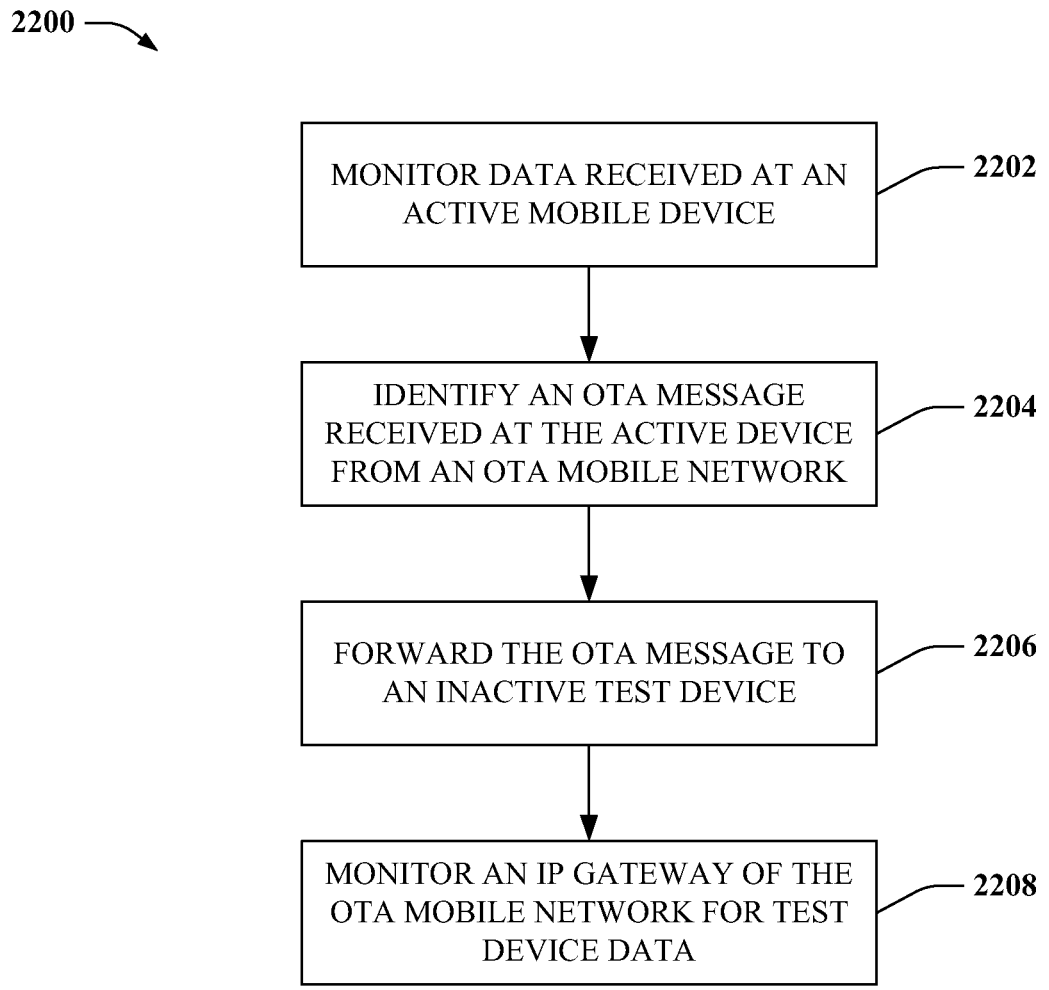
FIG. 22 illustrates an example methodology for testing applications of an inactive mobile device on a mobile network.

FIG. 22 illustrates an example methodology 2200 for testing applications of a mobile device on a mobile network, where such mobile device is not activated on the mobile network. At 2202, data received at mobile device that is activated on the mobile network can be monitored, as described herein. At 2204, an OTA message, received at the active mobile device from an OTA mobile network, can be identified from the data. At 2206, the OTA message can be forwarded to an inactive mobile device. The OTA message can be forwarded via any suitable wired and/or wireless network. In at least one aspect, the OTA message is forwarded at least in part by way of an IP data network, such as an intranet, or the Internet. AT 2208, an IP gateway associated with the OTA mobile network can be monitored for data that includes indicia identifying the inactive mobile device. Such data can be configured for compatibility with the OTA mobile network. Accordingly, method 2200 can provide an interface for the inactive test device to the OTA mobile network for network generated push messages as well as device generated pull messages.

Figure 23:
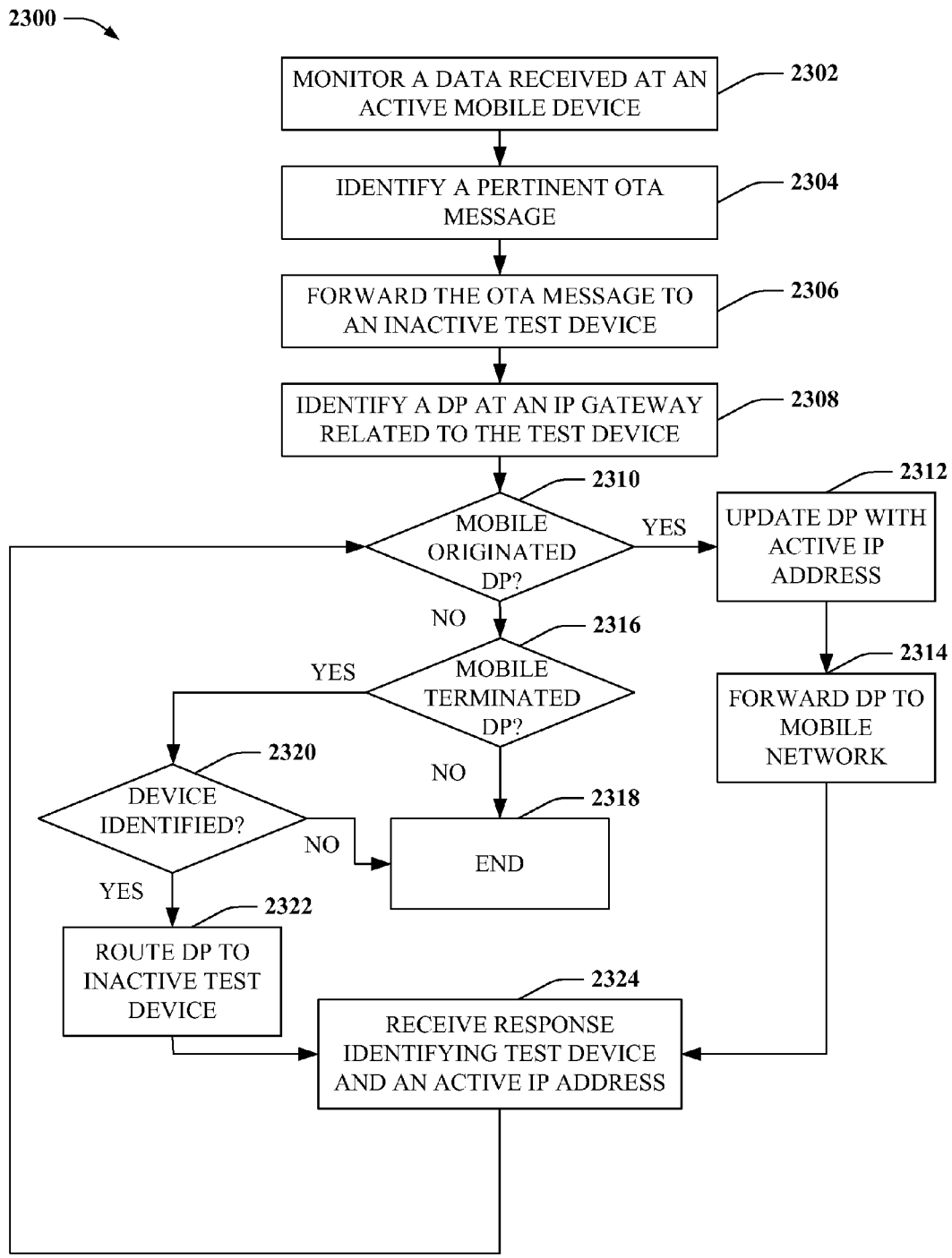
FIG. 23 depicts an example methodology for providing data exchange for push or pull messages of a mobile network with an inactive mobile device.

FIG. 23 depicts an example methodology 2300 for providing data exchange for push or pull messages of a mobile network with an inactive mobile device. At 2302, data received at a mobile device that is activated on an OTA mobile network can be monitored as described herein. At 2304, an OTA message pertinent to a selected client application or mobile device function can be identified from the data. At 2306, the OTA message can be forwarded to the inactive mobile device (e.g., over an IP network and/or a wired or wireless network interface utilized by the inactive mobile device).

At 2308, a data packet related to the inactive mobile device can be identified at an IP gateway associated with the mobile network. At 2310, a determination can be made as to whether the data packet is originated by the inactive mobile device. If the data packet is originated by the inactive mobile device, method 2300 can proceed to 2312. Otherwise, method 2300 can proceed to 2316.

At 2312, the data packet can be updated with an IP address of a device that is activated on the mobile network. In one aspect, the activated device can be a mobile device that is activated on the mobile network. In another aspect, the activated device can be a data card, SIM card, or a like device activated on the mobile network. According to at least one aspect, an originating IP address of the data packet can be updated to reflect the IP address of the activated device. At 2314, the updated data packet can be forwarded to the mobile network.

At 2316, method 2300 can determine whether the data packet identified at the IP gateway is terminated at the inactive test device, or the IP address of the active device. If not, method 2300 can proceed to 2318 where method 2300 terminates. If the data packet identified at the IP gateway is terminated at the inactive mobile device, method 2300 can proceed to 2320 where a determination is made as to whether the data packet includes indicia identifying the inactive test device. If no indicia suitable to identify the inactive test device is included within the data packet, method 2300 proceeds to 2318 and terminates. Otherwise, method 2300 proceeds to 2322 where the data packet is routed to the inactive test device, as described herein.

At 2324, method 2300 can receive a response an updated data packet forwarded to the mobile network. According to some aspects, the response can contain indicia identifying the inactive mobile device and/or the IP address of the activated device. Method 2300 can return to reference number 2310 to analyze the received response.

As described, method 2300 facilitates communication between a mobile network and a mobile device that is not activated with respect to the mobile network. An interface between the inactive mobile device and the mobile network can comprise, at least in part, an IP network. Furthermore, the inactive mobile device can couple to the IP network utilizing any suitable wireless interface, as described herein. In at least one aspect of the subject disclosure, the inactive mobile device can couple to the IP network from any suitable remote site having a data connection to the IP network. Accordingly, method 2300 can provide a substantial benefit by reducing time and costs associated with activating a test handset on a target mobile network and/or traveling to a region covered by wireless access points of the target mobile network.

Figure 24:
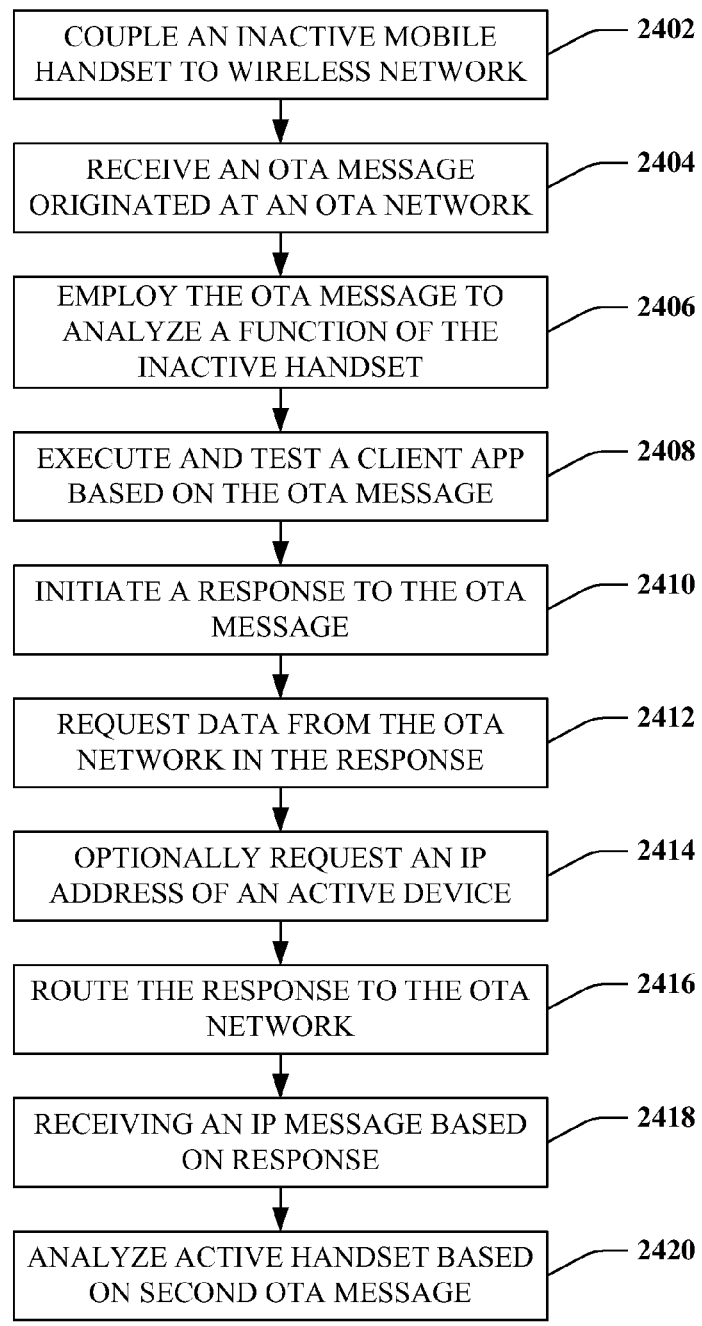
FIG. 24 illustrates an example methodology for conducting client device testing at a mobile device outside of OTA access to a service provider's network.

FIG. 24 illustrates an example methodology 2400 for testing network-related mobile device applications outside of OTA access points of a mobile communication provider's network. At 2402, method 2400 can communicatively couple a mobile device to a network by way of a wireless interface. In some aspects, the mobile device is not pre-activated with the mobile communication provider's network. Moreover, the wireless interface can comprise a licensed cellular interface, an unlicensed public frequency interface, an NFC interface, or other suitable wireless network interface as described herein or known in the art.

At 2404, an OTA message originated at the mobile communication provider's network is received. The OTA message can comprise syntax, addressing or routing formats, and the like, that are compatible with the mobile communication provider's network. At 2408, a client application can be executed at the mobile device based on receipt of the OTA message. Furthermore, the execution can be tested with respect to at least one client application parameter, or mobile device, network or wireless interface standard.

At 2410, a response to the OTA message is initiated. At 2410, method 2400 can include a request for data stored at a component of the mobile communication provider's network as part of the response. According to some aspects of the subject disclosure, the data can be pertinent to the executed client application or a related client application associated with the mobile device. At 2414, method 2400 can optionally request an IP address of a device that is activated on the mobile communication provider's network, and include the IP address as part of the response.

At 2416, method 2400 can route the response to the mobile communication provider's network. At 2418, a response from the mobile communication provider's network can be received. The response can be an IP data packet transmitted via an IP network, a satellite network, a wireless network, or a combination thereof or of the like. At 2420, method 2400 can analyze the executed client application, the related application or a function of the mobile device based on the IP data packet or data stored included within the IP data packet. In some aspects, the data included within the IP data packet comprises at least a portion of data stored at the component of the mobile communication provider's network. As described, method 2400 can facilitate testing network-related applications, software and/or hardware of a mobile device in a manner that provides reduced costs and/or delay typically associated with such testing. In at least one aspect, method 2400 can facilitate testing remote from a radio access network associated with the mobile communication provider's network, and without pre-activating a test handset on such network.

Figure 25:
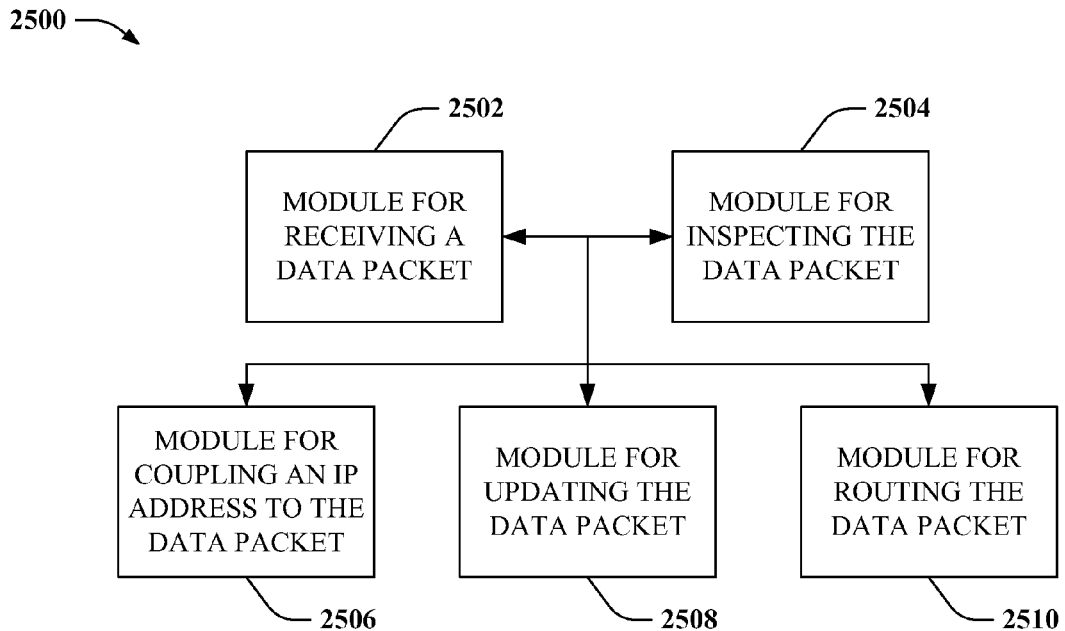
FIGS. 25 and 26 depict block diagrams of example systems that facilitate remote field testing for mobile device applications according to some aspects.
Figure 26:
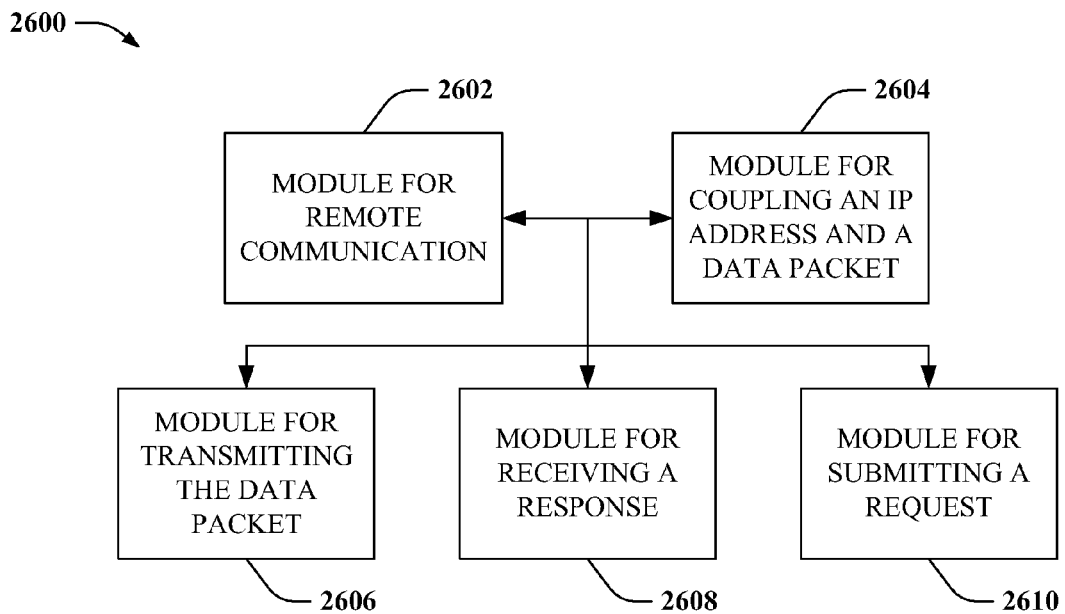

FIGS. 25 and 26 depict block diagrams of example systems 2500 and 2600, respectively, which facilitate remote field testing for mobile device applications according to some aspects of the subject disclosure. System 2500 can comprise, at 2502, a module for receiving a data packet directed to or originating from a mobile network of a wireless carrier. In addition, at 2504 system 2500 can comprise a module for inspecting the data packet. Specifically, module 2504 can determine whether an originating device associated with the data packet is a mobile handset that is not activated on the mobile network based on the inspecting. System 2500 can further comprise a module 2506 for enabling the data packet to utilize an IP address of a device that is activated on the mobile network of the wireless carrier if the originating device is the mobile handset.

In addition to the foregoing, system 2500 can further include a module 2508 for updating the data packet to include the IP address of the device activated on the mobile network. In at least one aspect, the module 2508 can effect the updating of the data packet if the data packet is directed (e.g., addressed) to the mobile network or a component of the mobile network. Moreover, system 2500 can comprise a module 2510 for routing the data packet to the mobile device. Specifically, the module 2510 can route the data packet to the mobile device if the data packet is directed to the device that is activated on the mobile network. In at least one aspect, the module 2510 can route the data packet to the mobile device if the data packet includes data pertinent to identify the mobile device.

System 2600 can comprise a module 2602 for remote communication that is configured to obtain access to an IP address of a device that is activated on a mobile network. System 2600 can further comprise a module 2604 for coupling the IP address with a data packet. The module 2604 can, for instance, couple the IP address with a data packet that is initiated at a mobile device that is not activated on the mobile network (e.g., pre-authorized to communication with the mobile network). In addition to the foregoing, system 2600 can comprise a module 2606 for transmitting the data packet over an IP network to a component of the mobile network. At 2608, system 2600 can include a module for receiving a response to the transmitted data packet. Such a response can originate, for instance, from the component of the mobile network and be addressed by the component to the device that is activated on the mobile network. In some aspects of the subject disclosure, system 2600 can additionally comprise a module 2610 for submitting a request to the device that is activated on the mobile network, or a routing module affiliated with such device, to obtain access to the IP address of such device. According to such aspects, system 2600 can request and obtain the IP address to configure data transmitted by the inactive mobile device in a manner that is authorized by the mobile network.

Figure 27:
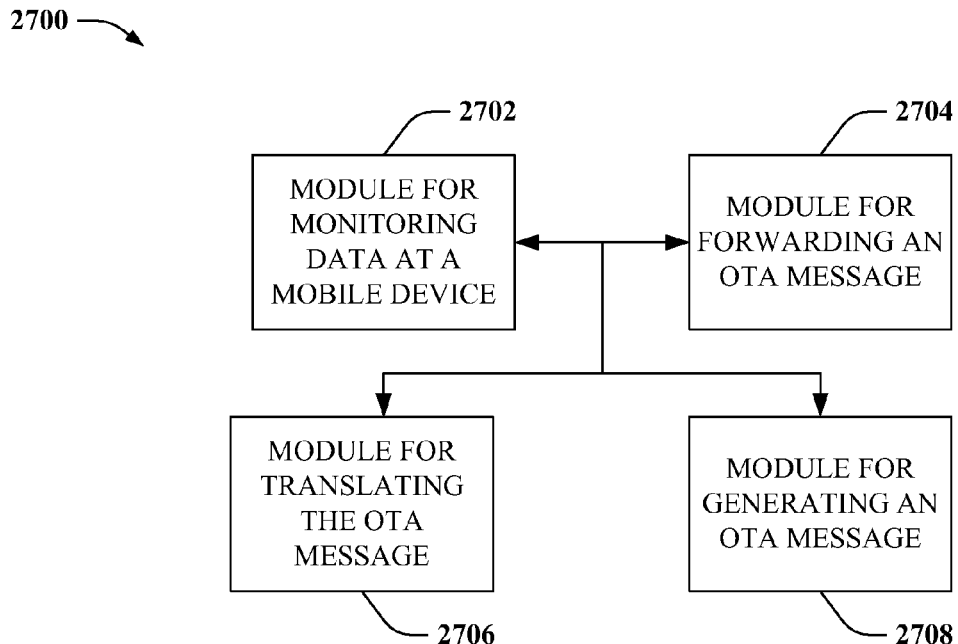
FIGS. 27 and 28 illustrate block diagrams of sample systems that facilitate remote testing of live or emulated OTA messages of a mobile network.
Figure 28:
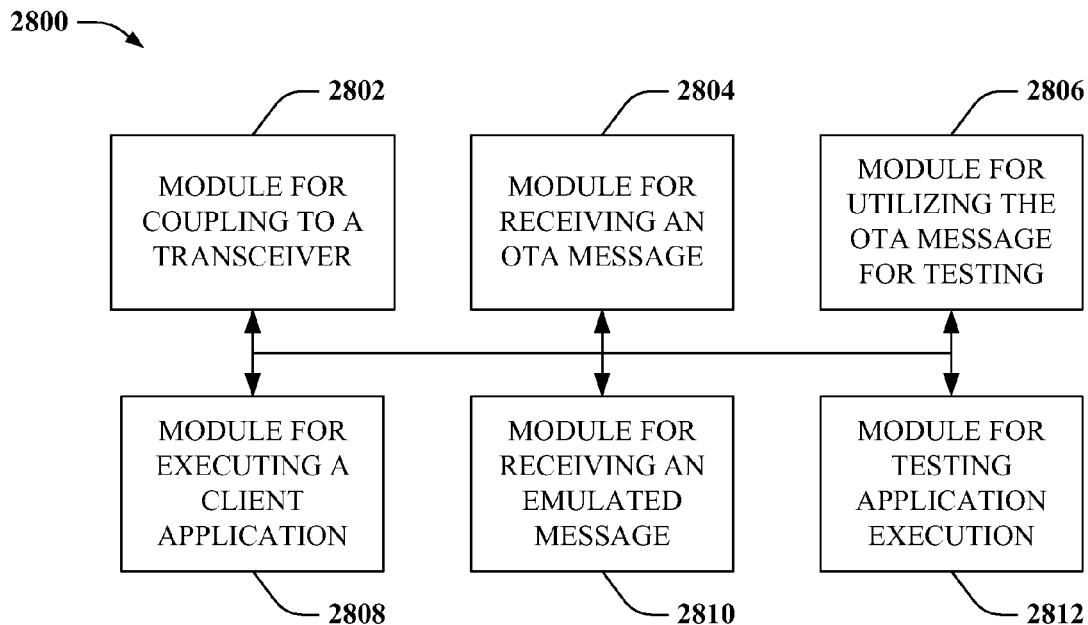

FIGS. 27 and 28 illustrate block diagrams of sample systems 2700 and 2800, respectively, which facilitate remote testing of live or emulated OTA messages of a mobile network. System 2700 can comprise a module 2702 for monitoring data, such as an OTA message, received at a mobile device from an OTA mobile network. Additionally, system 2700 can comprise a module 2704 for forwarding a received OTA message to a remote test handset that is not activated on the OTA mobile network. The received OTA message can be forwarded via an IP network, a satellite network, or a wired and/or wireless communication network, or a combination thereof.

In addition to the foregoing, system 2700 can comprise a module 2706 for translating the received OTA message into a format that is compatible with a target network serving the test device. For instance, if the target network is a cellular network, a WLAN network, a Bluetooth network, or like wireless communication network, the OTA message can be translated into a format compatible with such network. System 2700 can further comprise a module 2708 for generating a network message. Furthermore, the generated message can have a format particular to a wireless provider associated with the OTA mobile network. Module 2708 can route the generated network message to the test handset. In some aspects, the generated message can comprise network alerts, error messages, or the like, pertinent to the test device or an application associated with the test device.

System 2800 can comprise a module 2802 for communicatively coupling a test device to a wireless transceiver (e.g., a cellular transceiver, WLAN transceiver, a Bluetooth transceiver, an NFC transceiver, or a combination thereof or of the like). System 2800 can further comprise a module 2804 for receiving an OTA message from the wireless transceiver. In some aspects, the OTA message can comprise a push message delivered by an OTA mobile network to a mobile device that is activated on the OTA mobile network. Additionally, system 2800 can comprise a module 2806 for utilizing the OTA message to test a function, application, software, or firmware, or a combination thereof, of the test device. In at least some aspects, the test device is not activated on the OTA mobile network, as described herein. In addition to the foregoing, system 2800 can comprise a module 2808 for executing a client application related to the OTA message based on receipt of the OTA message. Further, system 2800 can comprise a module 2810 for receiving an emulated message from the wireless transceiver, where the emulated message contains syntax or a routing or addressing format particular to a wireless carrier. According to at least one aspect, system 2800 can further comprise a module 2812 for testing execution of a client application related to the emulated message based, at least in part, on receiving the emulated message.

Figure 29:
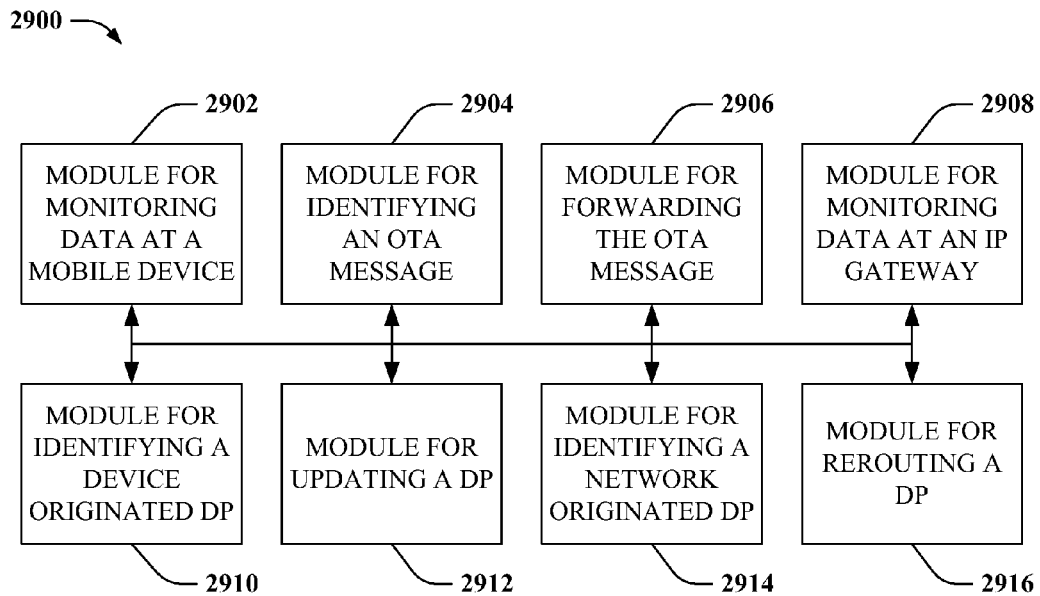
FIGS. 29 and 30 depict block diagrams of example systems that facilitate exchange of push or pull messages between an inactive device and a mobile network.
Figure 30:
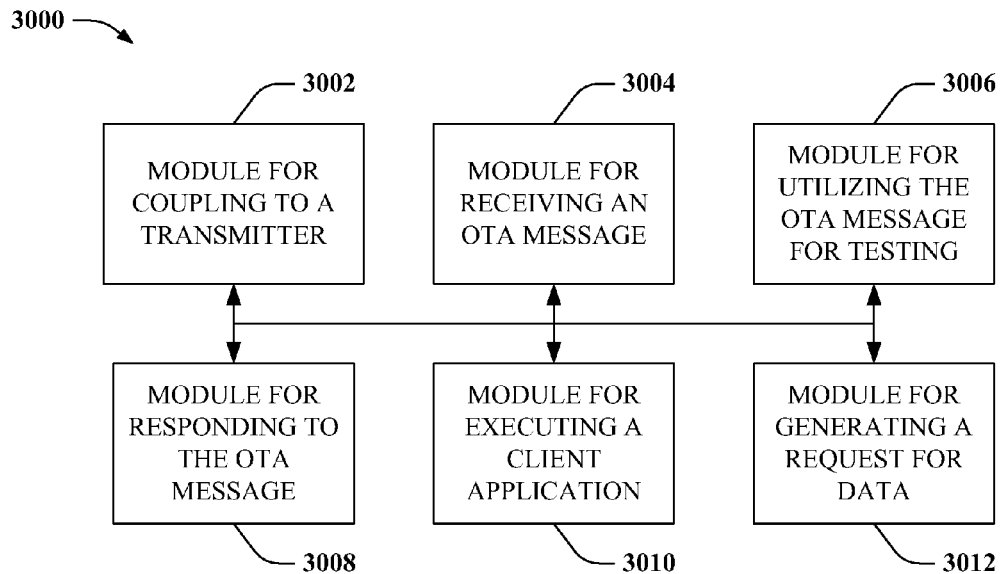

FIGS. 29 and 30 depict block diagrams of example systems 2900 and 3000, respectively, which facilitate exchange of push or pull messages between an inactive device and a mobile network. System 2900 can comprise a module 2902 for monitoring data received at a mobile device that is activated on an OTA mobile network. Further, system 2900 can include a module 2904 for identifying an OTA message received at the mobile device. Moreover, system 2900 can include a module 2906 for forwarding the OTA message to a test device that is not activated on the OTA mobile network. In at least one aspect, system 2900 can additionally comprise a module 2908 for monitoring an IP gateway associated with the OTA mobile network for data originated from the test device or associated with the test device. The module 2908 can inspect data received at the IP gateway for indicia identifying the test device, such as an IP address, a MAC address, or other indicia suitable to distinguish the test device.

According to some aspects of the subject disclosure, system 2900 can include a module 2910 for identifying a data packet at the IP gateway that is originated by the test device. Further, system 2900 can include a module 2912 for updating the data packet to include ID information (e.g., IP address, MAC address) of a selected device that is activated on the OTA mobile network. In addition, system 2900 can comprise a module 2914 for identifying a data packet at the IP gateway originated at the OTA mobile network that contains ID information of the selected device that is activated on the OTA mobile network. According to some aspects, system 2900 can also comprise a module 2916 for rerouting the data packet that contains ID information of the selected device to an IP interface associated with the test device.

System 3000 can comprise a module 3002 for communicatively coupling an un-activated mobile handset to a wireless transmitter of an IP network. System 3000 can further comprise a module 3004 for receiving from the wireless transmitter an OTA message originated at a mobile network. In addition, system 3000 can comprise a module 3006 for employing the OTA message, at least in part, to analyze a function, application, software, or firmware, or a combination thereof, of the un-activated mobile handset. According to at least one aspect, system 3000 can further comprise a module 3008 for initiating a response to the OTA message. The response can comprise a request for data from a component of the mobile network pertinent to the analyzed function, application, software, firmware, etc., or to a related entity.

In addition to the foregoing, system 3000 can comprise a module 3010 for executing a client application at the un-activated mobile handset utilizing information pertaining to or contained within the OTA message. For instance, a mobile network push message, such as an alert, notification, or the like (e.g., an announcement that an e-mail has been received), can be utilized to execute a client application based on the alert or notification. System 3000 can also comprise a module 3012 for generating a request for data pertinent to the client application, or a second client application of the un-activated mobile handset, based on the OTA message. The request for data can be included within the response. According to some aspects, the response can be routed to the mobile network (optionally by coupling identifying indicia associated with a device that is activated on the mobile network, as described herein with the response) to obtain the data from a component of such network.

What has been described above includes examples of one or more aspects. It is, of course, not possible to describe every conceivable combination of components or methodologies for purposes of describing the aforementioned aspects, but one of ordinary skill in the art may recognize that many further combinations and permutations of various aspects are possible. Accordingly, the described aspects are intended to embrace all such alterations, modifications and variations that fall within the scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A network device comprising:
an interface to receive data packets at the network device;
a field testing module configured to:
determine that a first received data packet was transmitted from a remote mobile device activated on a first provider network;
determine an Internet Protocol (IP) address of the remote mobile device activated on the first provider network;
receive a second data packet transmitted from a mobile device not activated on the first provider network;
modify the second data packet to include the IP address of the remote mobile device activated on the first provider network; and
transmit the second data packet.

2. The network device of claim 1, wherein the mobile device is a handset.

3. The network device of claim 1, wherein the field testing module is further configured to forward at least a portion of the first received data packet to the mobile device not activated on the first provider network.

4. The network device of claim 3, wherein the field testing module is configured to interface wirelessly with the mobile device not activated on the first provider network.

5. The network device of claim 1, wherein the field testing module is further configured to store the first received data packet for subsequent delivery to a mobile device not activated on the first provider network, and further configured to employ the first received data packet to test or modify at least one of a function, an application, software, or firmware of the mobile device not activated on the first provider network in response to a request for addition data from the mobile device not activated on the first provider network.

6. The network device of claim 1, wherein the field testing module is further configured to modify the first received data packet to conform to a format particular to a second provider network.

7. The network device of claim 6, wherein the mobile device not activated on the first provider network is activated on a second provider network.

8. The network device of claim 1, wherein the field testing module is further configured to modify the second received data packet to conform to a format particular to the first provider network.

9. The network device of claim 1, wherein the first provider network does not provide radio coverage over the geographical location of the field testing module.

10. A method of conducting remote testing comprising:
receiving data packets at a network device;
determining that a first received data packet was transmitted from a remote mobile device activated on a first provider network;
determining an Internet Protocol (IP) address of the remote mobile device activated on a first provider network;
receiving a second data packet transmitted from a mobile device not activated on the first provider network;
modifying the second data packet to include the IP address of the remote mobile device activated on a first provider network; and
transmitting the second data packet.

11. The method of claim 10, wherein the mobile device is a handset.

12. The method of claim 10, wherein at least a portion of the first received data packet is forwarded to the mobile device not activated on the first provider network.

13. The method of claim 12, wherein the second data packet is received via a wireless protocol.

14. The method of claim 10, wherein the first received data packet is stored for subsequent delivery to a mobile device not activated on the first provider network.

15. The method of claim 10, wherein the first received data packet is modified to conform to a format particular to a second provider network.

16. The method of claim 15, wherein the mobile device not activated on the first provider network is activated on a second provider network.

17. The method of claim 10, wherein the second received data packet is modified to conform to a format particular to the first provider network.

18. The method of claim 10, wherein the first provider network does not provide radio coverage over the geographical location of the mobile device not activated on the first provider network.

19. An apparatus that conducts remote testing comprising:
means for receiving data packets at a network device;
means for determining that a first received data packet was transmitted from a remote mobile device activated on a first provider network;
means for determining an Internet Protocol (IP) address of the remote mobile device activated on a first provider network;
means for receiving a second data packet transmitted from a mobile device not activated on the first provider network;
means for modifying the second data packet to include the IP address of the remote mobile device activated on a first provider network; and
means for transmitting the second data packet.

20. The apparatus of claim 19, wherein the first provider network does not provide radio coverage over the geographical location of the mobile device not activated on the first provider network.

21. The apparatus of claim 20, wherein the mobile device is a handset.

22. The apparatus of claim 20, wherein at least a portion of the first received data packet is forwarded to the mobile device not activated on the first provider network.

23. The apparatus of claim 22, wherein the second data packet is received via a wireless protocol.

24. The apparatus of claim 20, wherein the first received data packet is stored for subsequent delivery to a mobile device not activated on the first provider network.

25. The apparatus of claim 20, wherein the first received data packet is modified to conform to a format particular to a second provider network.

26. A non-transitory, computer-readable medium comprising
executable instructions for causing a computer to:
receive data packets;
determine that a first received data packet was transmitted from a remote mobile device activated on a first provider network;
determine an Internet Protocol (IP) address of the remote mobile device activated on a first provider network;
receive a second data packet transmitted from a mobile device not activated on the first provider network;
modify the second data packet to include the IP address of the remote mobile device activated on a first provider network; and
transmit the second data packet.

27. The non-transitory computer-readable medium of claim 26, wherein the mobile device is a handset.

28. The non-transitory computer-readable medium of claim 26, wherein the instructions are further executable to cause a computer to forward at least a portion of the first received data packet to the mobile device not activated on the first provider network.

29. The non-transitory computer-readable medium of claim 28, wherein the second data packet is received via a wireless protocol.

30. The non-transitory computer-readable medium of claim 26, wherein the instructions are further executable to cause a computer to store the first received data packet for subsequent delivery to a mobile device not activated on the first provider network.

31. The non-transitory computer-readable medium of claim 26, wherein the instructions are further executable to cause a computer to modify the first received data packet to conform to a format particular to a second provider network.

32. The non-transitory computer-readable medium of claim 26, wherein the instructions are further executable to cause a computer to conform to a format particular to the first provider network.

* * * * *